United States Patent
Chen et al.

(10) Patent No.: US 12,353,008 B2
(45) Date of Patent: ***Jul. 8, 2025

(54) PACKAGE, OPTICAL DEVICE, AND MANUFACTURING METHOD OF PACKAGE

(71) Applicant: Taiwan Semiconductor Manufacturing Company, Ltd., Hsinchu (TW)

(72) Inventors: Hsien-Wei Chen, Hsinchu (TW); Ming-Fa Chen, Taichung (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/354,662

(22) Filed: Jul. 19, 2023

(65) Prior Publication Data

US 2023/0358956 A1 Nov. 9, 2023

Related U.S. Application Data

(63) Continuation of application No. 17/751,666, filed on May 24, 2022, now Pat. No. 11,789,201, which is a continuation of application No. 17/076,795, filed on Oct. 21, 2020, now Pat. No. 11,372,160.

(60) Provisional application No. 62/968,161, filed on Jan. 31, 2020.

(51) Int. Cl.
G02B 6/42 (2006.01)
G02B 6/122 (2006.01)
G02B 6/12 (2006.01)

(52) U.S. Cl.
CPC ......... *G02B 6/1225* (2013.01); *G02B 6/4239* (2013.01); *G02B 6/4283* (2013.01); *G02B 2006/1213* (2013.01)

(58) Field of Classification Search
CPC .................................................. G02B 6/4283
See application file for complete search history.

(56) References Cited

U.S. PATENT DOCUMENTS

| | | | | |
|---|---|---|---|---|
| 5,621,837 | A * | 4/1997 | Yamada ............... | G02B 6/4232 385/88 |
| 6,301,401 | B1 * | 10/2001 | La ......................... | H01L 31/167 257/E31.117 |
| 6,574,379 | B2 * | 6/2003 | Miyazaki ................ | G02F 1/025 385/88 |
| 10,180,547 | B2 * | 1/2019 | Lee ..................... | H01S 5/02326 |

(Continued)

FOREIGN PATENT DOCUMENTS

| | | | |
|---|---|---|---|
| CN | 103754817 A * | 4/2014 | |
| EP | 0366974 A1 * | 5/1990 | |

OTHER PUBLICATIONS

CN-103754817-A English translation (Year: 2014).*

*Primary Examiner* — Charlie Y Peng
(74) *Attorney, Agent, or Firm* — JCIPRNET

(57) ABSTRACT

A package includes a photonic integrated circuit die and an electric integrated circuit die. The photonic integrated circuit die includes a substrate and a waveguide. The substrate has a notch and the notch is occupied by air. The waveguide is disposed over the substrate. In a top view, a first portion of the waveguide is overlapped with the substrate and a second portion of the waveguide is overlapped with the notch. The electric integrated circuit die is disposed over the photonic integrated circuit die.

20 Claims, 16 Drawing Sheets

(56) References Cited

U.S. PATENT DOCUMENTS

| | | | |
|---|---|---|---|
| 10,948,668 B2* | 3/2021 | Huang | G02B 6/4224 |
| 2007/0280585 A1* | 12/2007 | Warashina | G02B 6/43 |
| | | | 385/14 |
| 2008/0018477 A1* | 1/2008 | Forster | G06K 19/0717 |
| | | | 340/572.1 |
| 2018/0003899 A1* | 1/2018 | Doerr | G02B 6/4225 |
| 2018/0122785 A1* | 5/2018 | Fiorentino | H01L 24/80 |

\* cited by examiner

PACKAGE, OPTICAL DEVICE, AND MANUFACTURING METHOD OF PACKAGE

CROSS-REFERENCE TO RELATED APPLICATION

This is a continuation application of and claims the priority benefit of U.S. application Ser. No. 17/751,666, filed on May 24, 2022, now allowed. The prior U.S. application Ser. No. 17/751,666 is a continuation application of and claims the priority benefit of U.S. application Ser. No. 17/076,795, filed on Oct. 21, 2020, now patented. The prior U.S. application Ser. No. 17/076,795 claims the priority benefit of U.S. provisional application Ser. No. 62/968,161, filed on Jan. 31, 2020. The entirety of each of the above-mentioned patent applications is hereby incorporated by reference herein and made a part of this specification.

BACKGROUND

Currently, semiconductor structures including both photonic integrated circuit dies (known as P-dies) and electric integrated circuit dies (known as E-dies) are becoming increasingly popular for their compactness. In addition, due to the widely use of optical fiber-related applications for signal transmission, optical signaling and processing have been used in more applications. Although existing methods of fabricating the semiconductor structures have been generally adequate for their intended purposes, they have not been entirely satisfactory in all respects. For example, challenges rise to develop robust process for interconnecting among P-dies, E-dies, and optical fibers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
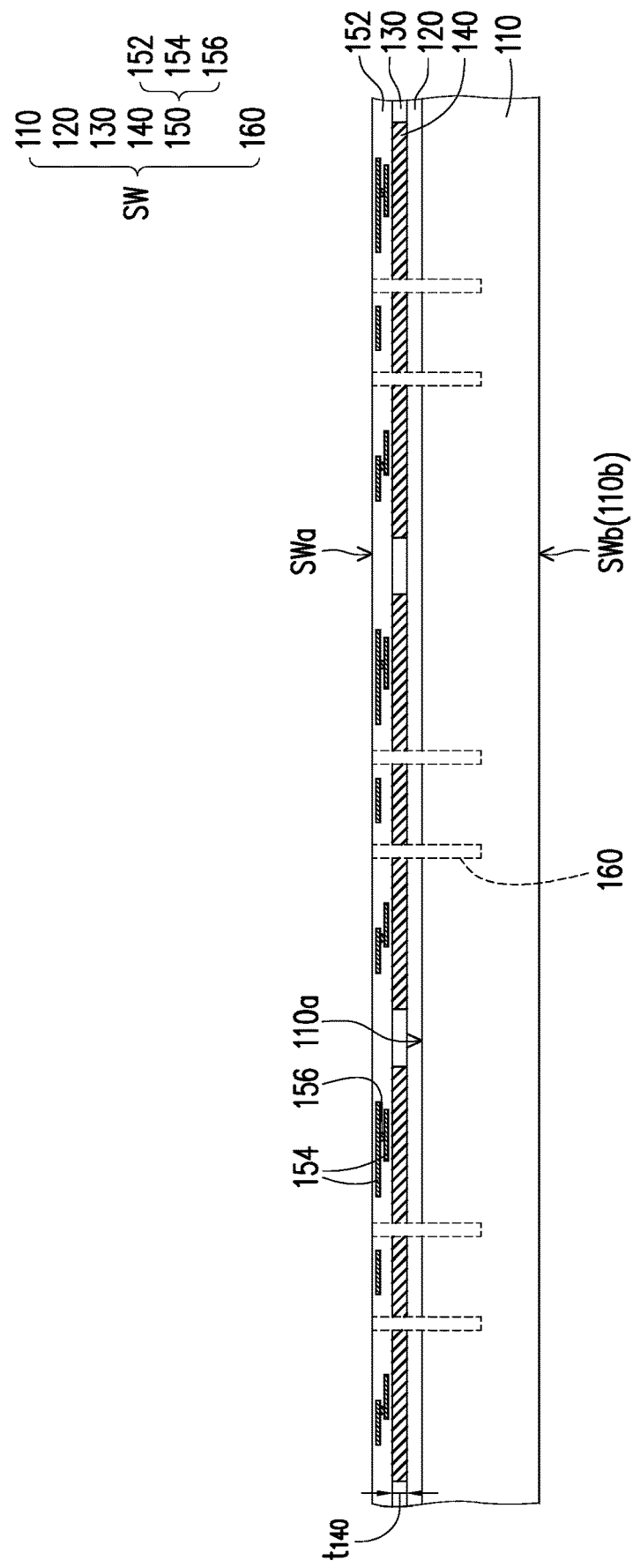
FIG. 1A to FIG. 1K are schematic cross-sectional views illustrating a manufacturing process of an optical device in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

FIG. 1A to FIG. 1K are schematic cross-sectional views illustrating a manufacturing process of an optical device OP1 in accordance with some embodiments of the disclosure. Referring to FIG. 1A, a semiconductor wafer SW is provided. In some embodiments, the semiconductor wafer SW may be referred to as a "photonic wafer." For example, the semiconductor wafer SW may include photonic components to process, receive, and/or transmit optical signals. In some embodiments, the semiconductor wafer SW includes a semiconductor substrate 110, an insulation layer 120, a dielectric layer 130, a plurality of waveguides 140, an interconnection structure 150, and a plurality of through vias 160. In some embodiments, the semiconductor substrate 110, the insulation layer 120, the waveguides 140, and the interconnection structure 150 are stacked in sequential order.

In some embodiments, the semiconductor substrate 110 has a first surface 110a and a second surface 110b opposite to the first surface 110a. In some embodiments, the semiconductor substrate 110 may be made of elemental semiconductor materials, such as crystalline silicon, diamond, or germanium; compound semiconductor materials, such as silicon carbide, gallium arsenic, gallium phosphide, indium antimonide, indium arsenide, or indium phosphide; or alloy semiconductor materials, such as silicon germanium, silicon germanium carbide, gallium arsenic phosphide, or gallium indium phosphide. In some embodiments, the semiconductor substrate 110 may be a bulk semiconductor substrate, which may be doped (e.g., with a p-type or an n-type dopant) or undoped. Alternatively, the semiconductor substrate 110 may be a multi-layered or gradient substrate. In some embodiments, the semiconductor substrate 110 has a plurality of semiconductor components (e.g., transistors, capacitors, photodiodes, combinations thereof, or the like) and/or a plurality of optical components (e.g. waveguides, filters, combinations thereof, or the like) formed therein.

In some embodiments, the insulation layer 120 is disposed on the first surface 110a of the semiconductor substrate 110. In some embodiments, the insulation layer 120 may be a buried oxide (BOX) layer, a silicon oxide layer, a silicon nitride layer, a titanium oxide layer, or the like. In some embodiments, the insulation layer 120 may be formed by a chemical vapor deposition (CVD) process, a physical vapor deposition (PVD) process, an atomic layer deposition (ALD) process, a spin-on process, the like, or a combination thereof. It should be noted that the insulation layer 120 may be optional. For example, the insulation layer 120 may be omitted in some embodiments.

As illustrated in FIG. 1A, the waveguides 140 are disposed on the insulation layer 120. In some embodiments, the waveguides 140 may be formed by the following steps. First, a semiconductor layer (not shown) is disposed on the insulation layer 120. In some embodiments, the semiconductor substrate 110, the insulation layer 120, and the semiconductor layer may be collectively referred to as a "semiconductor-on-insulator (SOI) substrate." A material of the semiconductor layer and the material of the semiconductor substrate 110 may be the same or may be different from each other. For example, the semiconductor layer may be made of elemental semiconductor materials, such as crystalline silicon, diamond, or germanium; compound semiconductor materials, such as silicon carbide, gallium arsenic, gallium phosphide, indium antimonide, indium arsenide, or indium phosphide; or alloy semiconductor materials, such as silicon germanium, silicon germanium carbide, gallium arsenic phosphide, or gallium indium phosphide. Subsequently, the semiconductor layer may be doped with a p-type or an n-type dopant. Thereafter, the doped semiconductor layer is patterned to form waveguides 140. In some embodiments, the waveguides 140 are able to transmit optical signals entering from a lateral side. For example, the waveguides 140 may be referred to as "edge couplers." In some embodiments, the waveguides 140 have broad bandwidth with small polarization dependent loss. In some embodiments, a thickness $t_{140}$ of the waveguides 140 ranges from about 100 nm to about 150 nm.

In some embodiments, the dielectric layer 130 is disposed on the insulation layer 120 to laterally cover the waveguides 140. For example, the waveguides 140 are embedded in the dielectric layer 130. In some embodiments, the dielectric layer 130 is made of transparent dielectric material. For example, the dielectric layer 130 may be formed of silicon oxide, silicon nitride, titanium oxide, the like, or a combination thereof. In some embodiments, the dielectric layer 130 may be formed by a CVD process, a PVD process, an ALD process, a spin-on process, the like, or a combination thereof.

In some embodiments, the interconnection structure 150 is formed over the dielectric layer 130 and the waveguides 140. The interconnection structure 150 includes an inter-dielectric layer 152, a plurality of patterned conductive layers 154, and a plurality of conductive vias 156. For simplicity, the inter-dielectric layer 152 is illustrated as a bulky layer in FIG. 1A, but it should be understood that the inter-dielectric layer 152 may be constituted by multiple dielectric layers. The patterned conductive layers 154 and the dielectric layers of the inter-dielectric layer 152 are stacked alternately. In some embodiments, the conductive vias 156 are embedded in the dielectric layers of the inter-dielectric layer 152. In some embodiments, two vertically adjacent patterned conductive layers 154 are electrically connected to each other through conductive vias 156. In some embodiments, the interconnection structure 150 may be electrically connected to the waveguides 140 and/or the semiconductor substrate 110 through contact structures (not shown). For example, the interconnection structure 150 may be electrically connected to the semiconductor components and/or the optical components formed in the semiconductor substrate 110.

In some embodiments, the inter-dielectric layer 152 may be formed of silicon oxide, silicon oxynitride, silicon nitride, or low-k dielectric materials having k values lower than about 3.0. The low-k dielectric materials may include Black Diamond (a registered trademark of Applied Materials), a carbon-containing low-k dielectric material, Hydrogen SilsesQuioxane (HSQ), MethylSilsesQuioxane (MSQ), or the like. Etch stop layers (not shown) may be formed to separate neighboring dielectric layers within the inter-dielectric layer 152. In some embodiments, the etch stop layers are formed of a material having a high etching selectivity relative to the dielectric layers of the inter-dielectric layer 152. For example, the etch stop layers may be formed of silicon carbide, silicon carbo-nitride, or the like. The inter-dielectric layer 152 may be formed by suitable fabrication techniques such as spin-on coating, CVD, plasma-enhanced chemical vapor deposition (PECVD), or the like. In some embodiments, a material of the patterned conductive layers 154 and a material of the conductive vias 156 include aluminum, titanium, copper, nickel, tungsten, and/or alloys thereof. The patterned conductive layers 154 and the conductive vias 156 may be formed by, for example, electroplating, deposition, and/or photolithography and etching. In some embodiments, the patterned conductive layers 154 and the underlying conductive vias 156 are simultaneously formed. For example, the patterned conductive layers 154 and the underlying conductive vias 156 may be formed by a dual-damascene process. It should be noted that the number of the dielectric layers in the inter-dielectric layer 152, the number of the patterned conductive layers 154, and the number of the conductive vias 156 shown in FIG. 1A are merely exemplary illustrations, and the disclosure is not limited. In some alternative embodiments, the number of the dielectric layers in the inter-dielectric layer 152, the number of the patterned conductive layers 154, and the number of the conductive vias 156 may be adjusted depending on the routing requirements.

As illustrate in FIG. 1A, the semiconductor wafer SW further includes the through vias 160 embedded in the semiconductor substrate 110, the insulation layer 120, the dielectric layer 130, and the inter-dielectric layer 152 of the interconnection structure 150. It should be noted that the through vias 160 are illustrated by dotted line to denote that the through vias 160 are not located on the cross-sectional plane in FIG. 1A. The through vias 160 may be located on a plane in front of or behind the cross-sectional plane in FIG. 1A. That is, the through vias 160 are illustrated in a perspective manner. For example, the through vias 160 do not penetrate through the waveguides 140. In some embodiments, the through vias 160 may be referred to as "through semiconductor vias." As illustrated in FIG. 1A, the through vias 160 extend vertically from the interconnection structure 150 to the semiconductor substrate 110. In some embodiments, the through vias 160 are formed of a conductive material. For example, the through vias 160 may include a metallic material, such as tungsten, copper, titanium, aluminum, nickel, alloys thereof, or the like. At this stage, the through vias 116 may not be accessibly exposed by the semiconductor substrate 110.

At this stage, a top surface of the interconnection structure 150 and top surfaces of the through vias 160 are collectively referred to as a first surface SWa of the semiconductor wafer SW. On the other hand, the second surface 110b of the semiconductor substrate 110 may be referred to as a second surface SWb of the semiconductor wafer SW. As illustrated in FIG. 1A, the second surface SWb of the semiconductor wafer SW is opposite to the first surface SWa of the semiconductor wafer SW. In some embodiments, the top surface of the interconnection structure 150 and the top surfaces of the through vias 160 are substantially levelled to provide an appropriate first surface SWa for bonding.

Figure 1B:
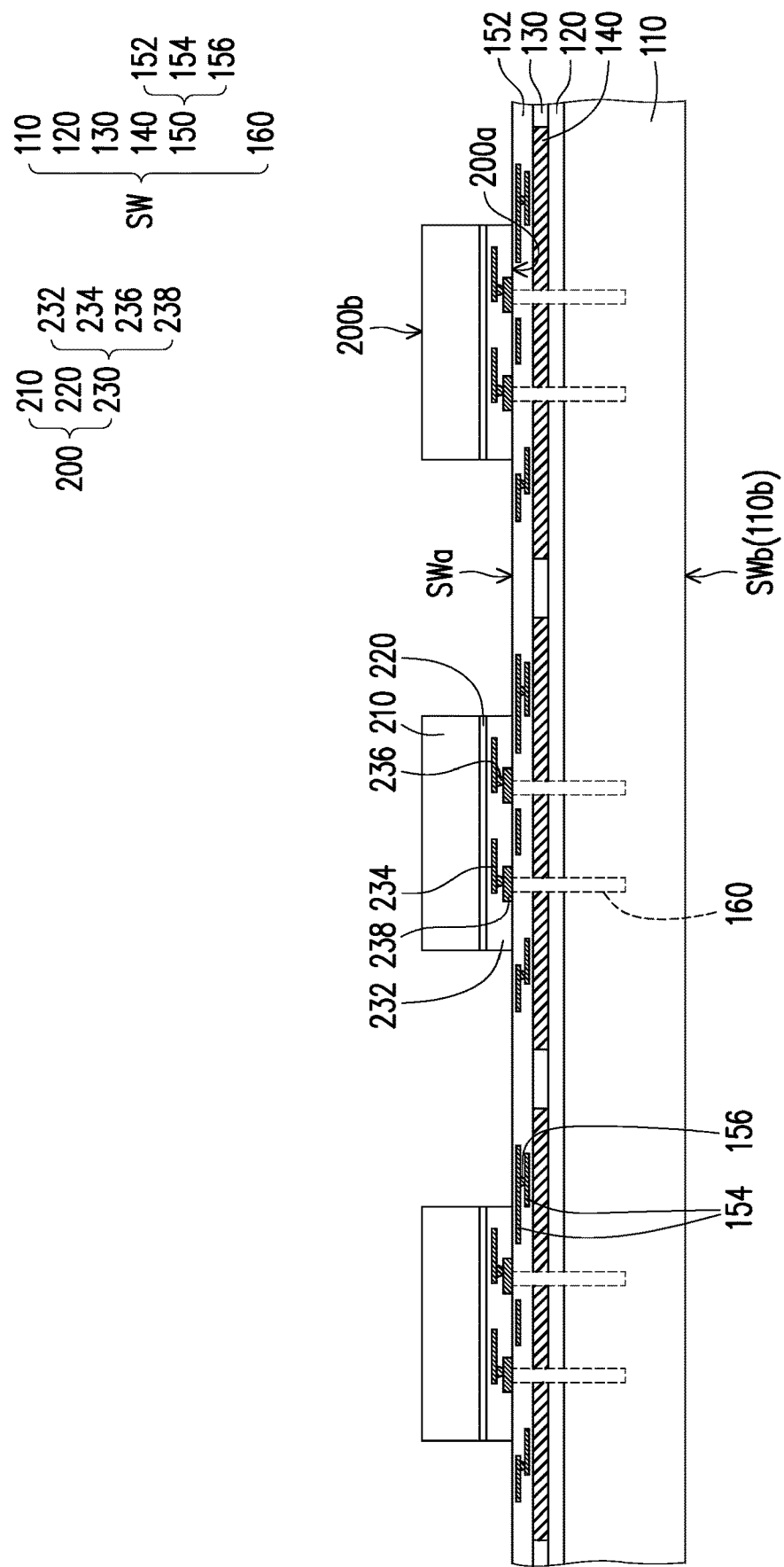

Referring to FIG. 1B, a plurality of electric integrated circuit dies 200 is bonded to the semiconductor wafer SW. In some embodiments, the electric integrated circuit dies 200 may be logic IC dies, memory dies, analog IC dies, application-specific IC (ASIC) dies, or the like. In some alternative embodiments, each of the electric integrated circuit dies 200 is a package structure of which a plurality of die components is encapsulated in a packaging encapsulation (e.g., molding compound; not shown). In some embodiments, each electric integrated circuit die 200 includes a semiconductor substrate 210, a device layer 200, and an interconnection structure 230.

In some embodiments, the semiconductor substrate 210 of the electric integrated circuit die 200 is similar to the semiconductor substrate 110 of the semiconductor wafer SW, so the detailed description thereof is omitted herein. In some embodiments, the device layer 220 is formed over the semiconductor substrate 210. In some embodiments, the device layer 220 includes a plurality of active devices and/or passive devices formed therein. Examples of the active devices include, but are not limited to, diodes, field effect transistors (FETs), metal-oxide-semiconductor FETs (MOSFETs), complementary metal-oxide-semiconductor (CMOS) transistors, bipolar transistors, or the like. On the other hand, examples of the passive devices include, but are not limited to, resistors, capacitors, inductors, or the like.

In some embodiments, the interconnection structure 230 is formed over the device layer 220. In some embodiments, the interconnection structure 230 is electrically coupled to the active devices and/or the passive devices in the device layer 220 through contact structures (not shown). The interconnection structure 230 includes an inter-dielectric layer 232, a patterned conductive layer 234, a plurality of conductive vias 236, and a plurality of bonding pads 238. The inter-dielectric layer 232, the patterned conductive layer 234, and the conductive vias 236 in the interconnection structure 230 are respectively similar to the inter-dielectric layer 152, the patterned conductive layers 154, and the conductive vias 156 in the interconnection structure 150, so the detailed descriptions thereof are omitted herein. It should be noted that the number of the dielectric layers in the inter-dielectric layer 232, the number of the patterned conductive layer 234, and the number of the conductive vias 236 shown in FIG. 1B are merely exemplary illustrations, and the disclosure is not limited. In some alternative embodiments, the number of the dielectric layers in the inter-dielectric layer 232, the number of the patterned conductive layer 234, and the number of the conductive vias 236 may be adjusted depending on the routing requirements. For example, when more than one layer of the patterned conductive layer 234 are presented, these patterned conductive layers 234 may be electrically connected to each other through the conductive vias 236 located between the two. As illustrated in FIG. 1B, the bonding pads 238 are embedded in the inter-dielectric layer 232. In some embodiments, the bonding pads 238 are connected to the patterned conductive layer 234 through the conductive vias 236. That is, the bonding pads 238 are electrically coupled to the active devices and/or the passive devices in the device layer 220 through the conductive vias 236 and the patterned conductive layer 234. In some embodiments, a material of the bonding pads 238 may be the same or may be different from the material of the patterned conductive layer 234 and the conductive vias 236. For example, the material of the bonding pads 238 may include a metallic material, such as tungsten, copper, titanium, aluminum, nickel, alloys thereof, or the like.

In some embodiments, a bottom surface of the inter-dielectric layer 232 and bottom surfaces of the bonding pads 238 shown in FIG. 1B are collectively referred to as a first surface 200a of the electric integrated circuit die 200. On the other hand, a top surface of the semiconductor substrate 210 shown in FIG. 1B may be referred to as a second surface 200b of the electric integrated circuit die 200. As illustrated in FIG. 1B, the second surface 200b of the electric integrated circuit die 200 is opposite to the first surface 200a of the electric integrated circuit die 200. In some embodiments, the bottom surface of the inter-dielectric layer 232 and the bottom surfaces of the bonding pads 238 are substantially levelled to provide an appropriate first surface 200a for bonding.

In some embodiments, the electric integrated circuit dies 200 are distributed in an array on the semiconductor wafer SW. As illustrated in FIG. 1B, the electric integrated circuit dies 200 are bonded to the semiconductor wafer SW in a face-to-face manner. For example, the electric integrated circuit dies 200 are picked-and-placed onto the semiconductor wafer SW in a face down manner. That is, the first surface 200a of each electric integrated circuit die 200 is attached to the first surface SWa of the semiconductor wafer SW. The bonding between the electric integrated circuit dies 200 and the semiconductor wafer SW may include hybrid bonding, fusion bonding, direct bonding, dielectric bonding, metal bonding, solder joints (e.g., micro-bumps), or the like. In some embodiments, the interconnection structure 230 of the electric integrated circuit die 200 is bonded to the interconnection structure 150 of the semiconductor wafer SW. For example, the bonding pads 238 of the electric integrated circuit die 200 are bonded to the through vias 160 exposed by the interconnection structure 150 of the semiconductor wafer SW. As such, the through vias 160 of the semiconductor wafer SW are electrically connected to the electric integrated circuit dies 200. Although not illustrated, the bonding pads 238 of the electric integrated circuit die 200 may also be bonded to the topmost patterned conductive layer 154 of the interconnection structure 150 of the semiconductor wafer SW. In some embodiments, the bottom surface of the inter-dielectric layer 232 of the electric integrated circuit die 200 may be bonded to the top surface of the inter-dielectric layer 152 of the semiconductor wafer SW through dielectric bonding.

As illustrated in FIG. 1B, each of the electric integrated circuit dies 200 may correspond to one of the waveguides 140 in the semiconductor wafer SW. For example, the bonding area of the respective electric integrated circuit die 200 overlaps with the area occupied by one of the waveguide 140 from a top view. However, the disclosure is not limited thereto. In some alterative embodiments, each of the electric integrated circuit dies 200 may correspond to multiple waveguides 140.

In some embodiments, since the electric integrated circuit dies 200 are bonded to the semiconductor wafer SW to render electrical/optical connection with the semiconductor wafer SW, the electric integrated circuit dies 200 are able to process the electrical signals converted from optical signals generated by the optical components in the semiconductor wafer SW.

Figure 1C:
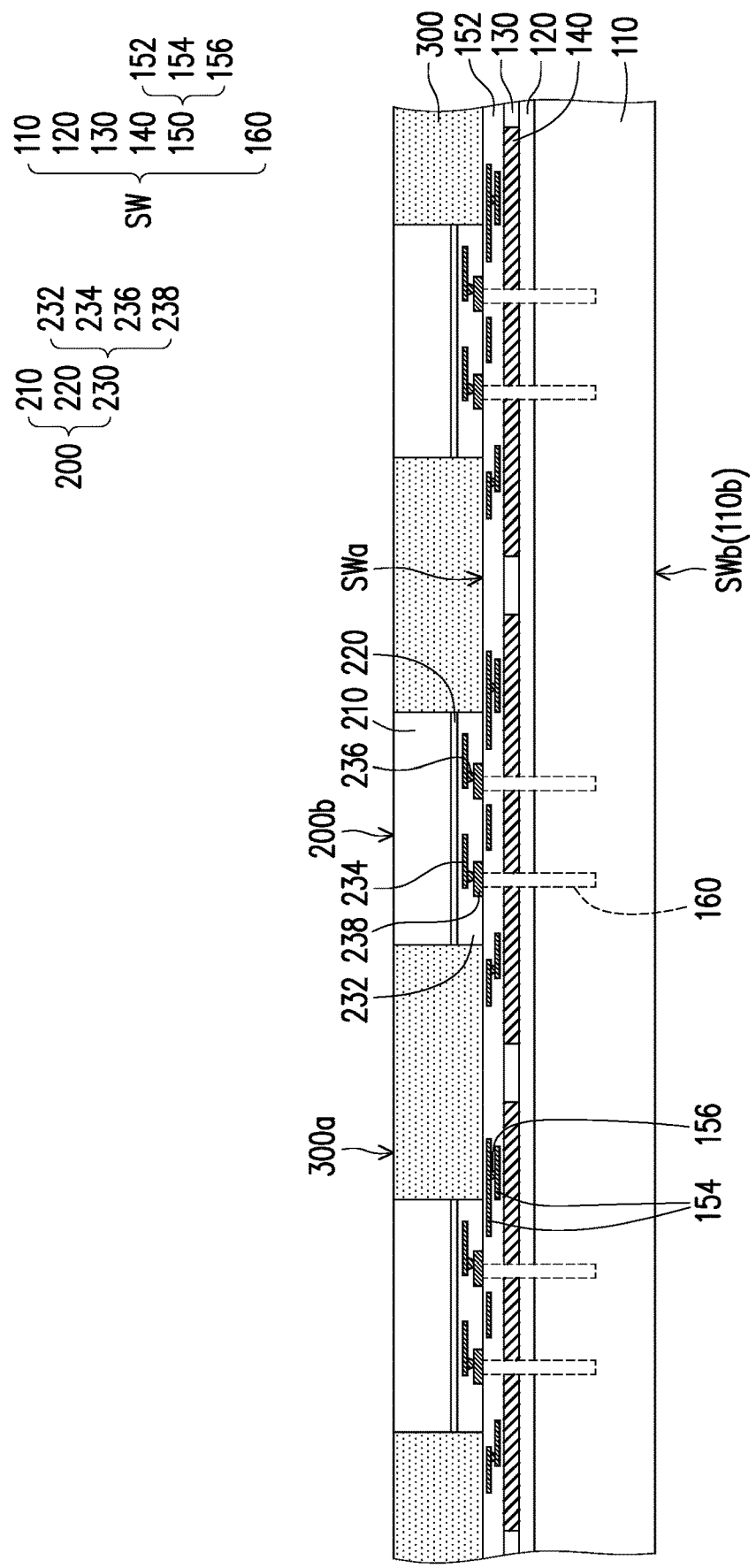

Referring to FIG. 1C, an encapsulant 300 is formed on the semiconductor wafer SW to laterally encapsulate the electric integrated circuit dies 200. In some embodiments, the encapsulant 300 fills a gap between two adjacent electric integrated circuit dies 200. In some embodiments, a material of the encapsulant 300 includes silicon oxide, silicon nitride, silicon carbide, fluoride-doped silicate glass (FSG), low-k dielectric, or the like. However, the disclosure is not limited thereto. In some alternative embodiments, the material of the encapsulant 300 includes a molding compound, a polymeric material, such as polyimide, epoxy resin, acrylic resin, phenol resin, BCB, PBO, a combination thereof, or other suitable polymer-based dielectric materials. In some embodiments, the encapsulant 300 further includes fillers. Alternatively, the encapsulant 300 may be free of fillers.

In some embodiments, the encapsulant 300 may be formed by the following steps. First, an encapsulation material (not shown) is formed over the semiconductor wafer SW to encapsulate the electric integrated circuit dies 200. At this stage, the semiconductor substrates 210 of the electric integrated circuit dies 200 are not revealed and are well protected by the encapsulation material. In some embodiments, the encapsulation material may be formed by a molding process (such as a compression molding process), a spin-coating process, a CVD process, a PECVD process, an ALD process, or the like. After the encapsulation material is formed, the encapsulation material is thinned until the semiconductor substrates 210 of the electric integrated circuit dies 200 are exposed. For example, the encapsulation material is thinned until the second surfaces 200b of the electric integrated circuit dies 200 are exposed. In some embodiments, the semiconductor substrates 210 and the encapsulation material are further thinned to reduce the overall thickness of the electric integrated circuit dies 200. In some embodiments, the encapsulation material and the semiconductor substrates 210 may be thinned or planarized through a grinding process, such as a mechanical grinding process, a chemical mechanical polishing (CMP) process, or the like. After the thinning process, each electric integrated circuit die 200 has a thinned semiconductor substrate 210 and the encapsulant 300 is formed to expose the semiconductor substrate 210. That is, the second surfaces 200b of the electric integrated circuit dies 200 are substantially coplanar with a top surface 300a of the encapsulant 300. In some embodiments, the encapsulant 300 may be referred to as "gap fill oxide." It should be noted that the foregoing process merely serves as an exemplary illustration, and the disclosure is not limited thereto. In some alternative embodiments, the encapsulant 300 may be formed after the semiconductor substrates 210 are thinned.

Figure 1D:
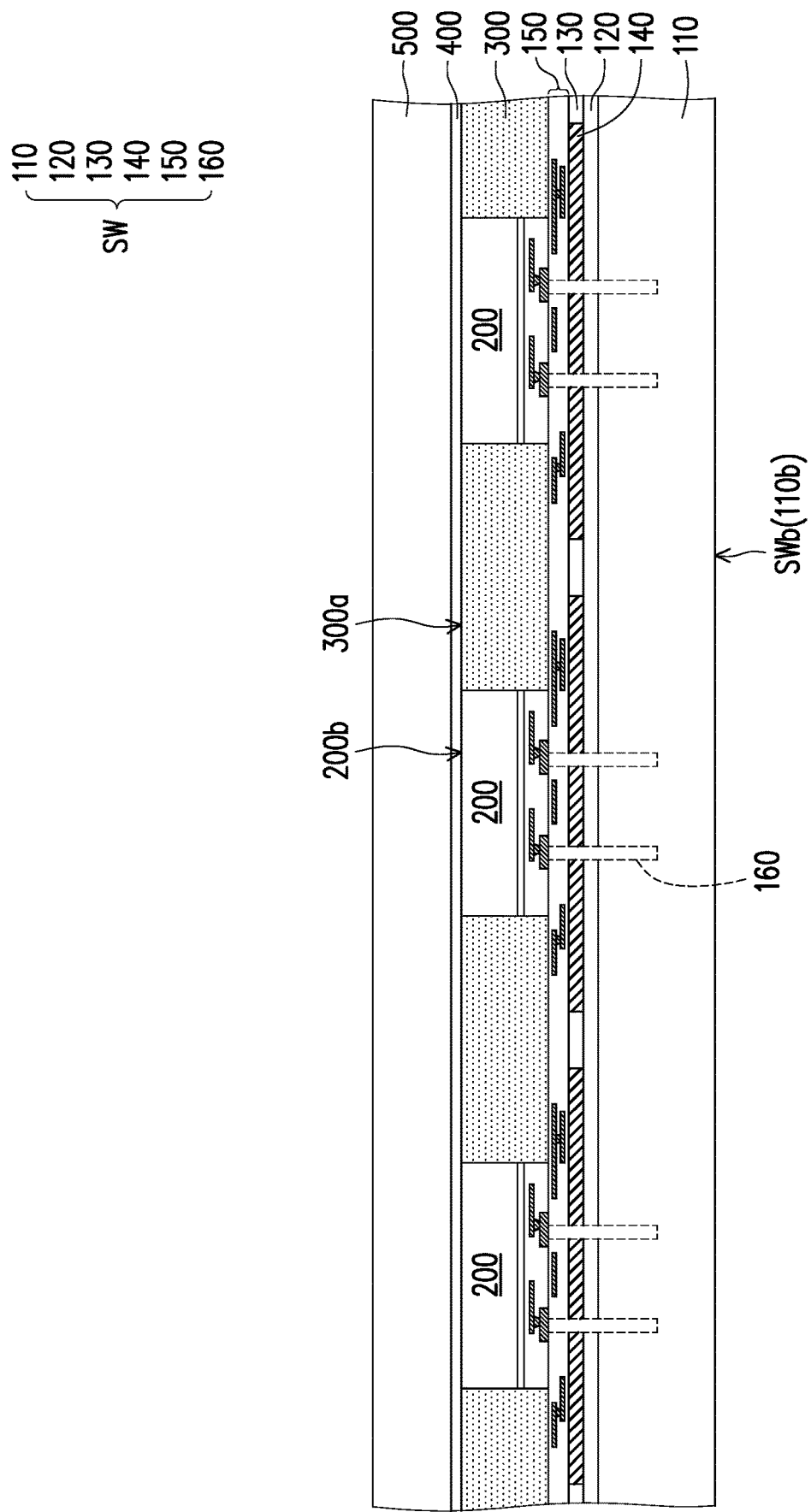

Referring to FIG. 1D, a bonding layer 400 and a supporting substrate 500 are formed over the second surface 200b of the electric integrated circuit die 200 and the top surface 300a of the encapsulant 300. In some embodiments, the bonding layer 400 is a smooth layer having a continuous even surface and overlaid on the electric integrated circuit dies 200 and the encapsulant 300. In some embodiments, a material of the bonding layer 400 may include silicon oxynitride (SiON), silicon oxide, silicon nitride or the like, and the bonding layer 400 may be formed by deposition or the like. In some embodiments, the bonding layer 400 has a substantially uniform and even thickness.

In some embodiments, the supporting substrate 500 is bonded to the bonding layer 400. In some embodiments, the supporting substrate 500 includes semiconductor materials. For example, the supporting substrate 500 may be made of a suitable elemental semiconductor, such as crystalline silicon, diamond, or germanium; a suitable compound semiconductor, such as gallium arsenide, silicon carbide, indium arsenide, or indium phosphide; or a suitable alloy semiconductor, such as silicon germanium carbide, gallium arsenic phosphide, or gallium indium phosphide. However, the disclosure is not limited thereto. In some alternative embodiments, the supporting substrate 500 may be a glass substrate. In some embodiments, the supporting substrate 500 is free of active components and passive components. In some embodiments, the supporting substrate 500 is also free of wire routings. For example, the supporting substrate 500 may be a blank substrate which purely functions as a supporting element without serving any signal transmission function.

In some embodiments, the supporting substrate 500 is bonded to the electric integrated circuit dies 200 and the encapsulant 300 through fusion bonding. The fusion bonding process may include a hydrophilic fusion bonding process, where a workable temperature is approximately greater than or substantially equal to about 100° C. and a workable pressure is approximately greater than or substantially equal to about 1 kg/cm$^2$. In some embodiments, the fusion bonding process does not involve metal to metal bonding. In some embodiments, since the supporting substrate 500 is in wafer form, the process illustrated in FIG. 1D may be referred to as "wafer-to-wafer bonding." It should be noted that in some embodiments, the bonding layer 400 and the supporting substrate 500 may be optional. In other words, the step illustrated in FIG. 1D may be skipped.

Figure 1E:
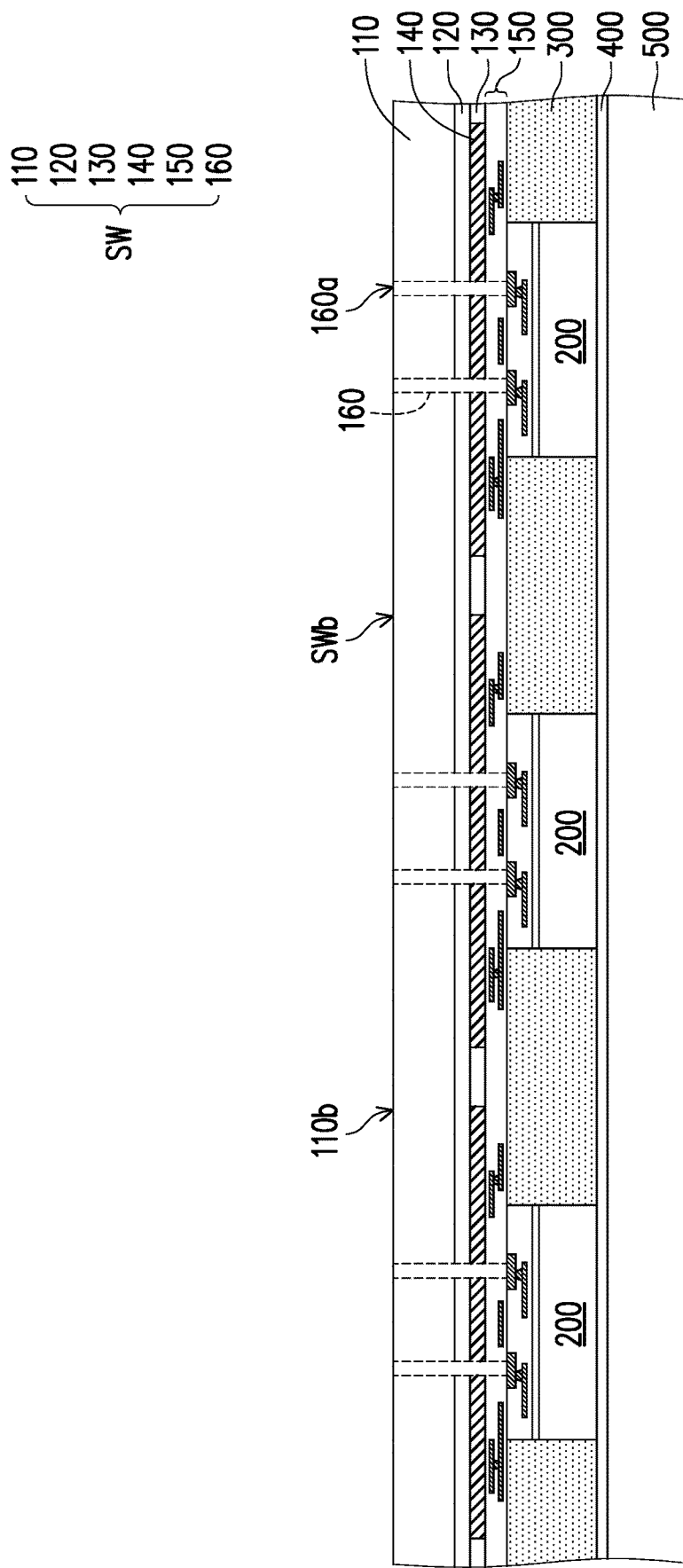

Referring to FIG. 1E, the structure illustrated in FIG. 1D is flipped upside down. Thereafter, a thickness of the semiconductor substrate 110 is reduced until the through vias 160 are accessibly revealed by the thinned semiconductor substrate 110 for further electrical connection. In some embodiments, the thinning process includes a CMP process, a mechanical grinding process, or the like. As illustrated in FIG. 1E, the semiconductor substrate 110 is thinned from the second surface 110b until the through vias 160 are exposed. In some embodiments, after the through vias 160 are exposed, the semiconductor substrate 110 and the through vias 160 may be further thinned slightly to reduce the overall thickness of the semiconductor substrate 110. In some embodiments, surfaces 160a of the through vias 160 and the second surface 110b of the thinned semiconductor substrate 110 are substantially leveled. At this stage, the surfaces 160a of the through vias 160 and the second surface 110b of the semiconductor substrate 110 may be collectively referred to as the second surface SWb of the semiconductor wafer SW. As illustrated in FIG. 1E, after the thinning process, the through vias 160 penetrate through the semiconductor substrate 110.

Figure 1F:
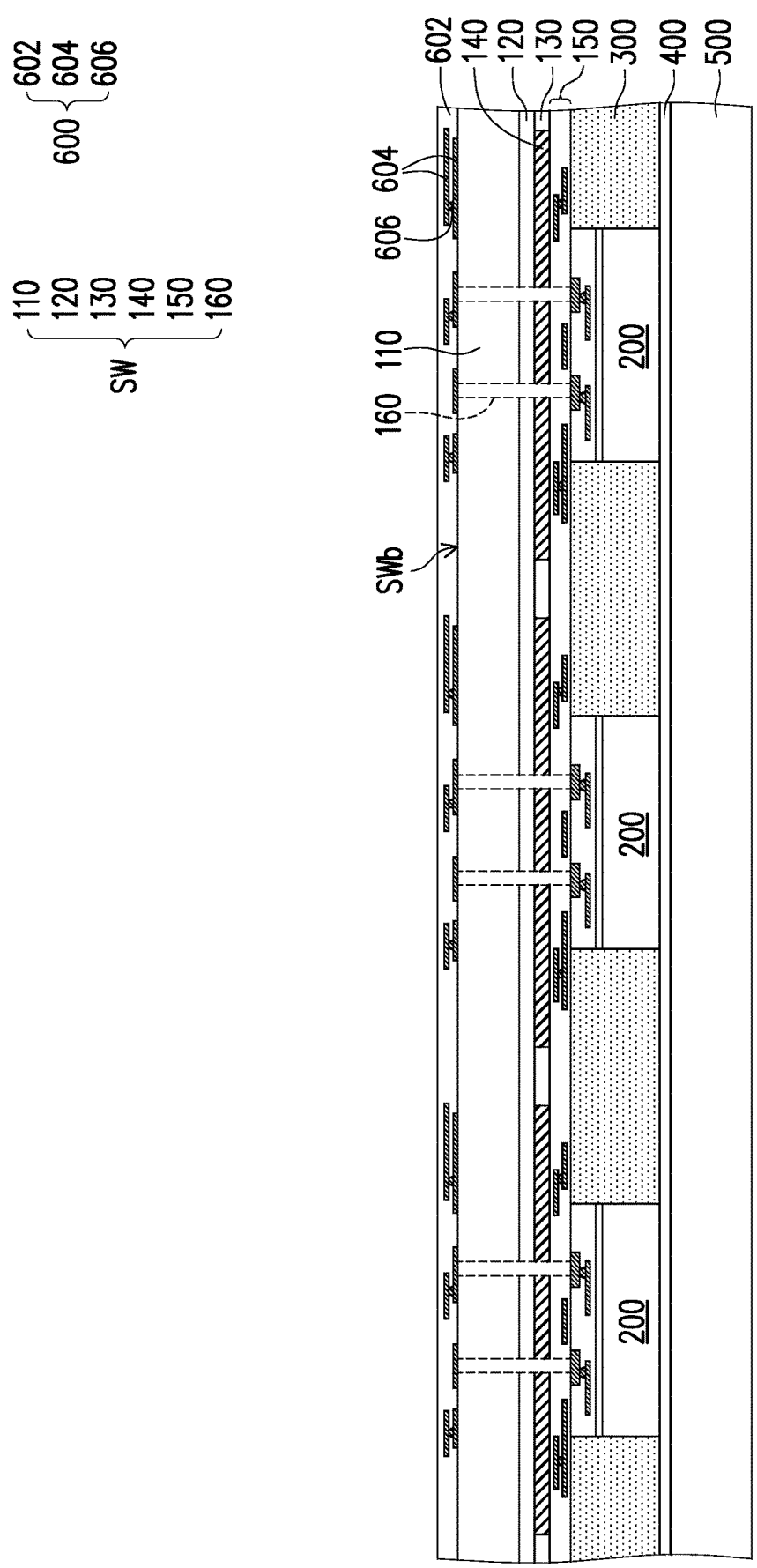

Referring to FIG. 1F, a redistribution structure 600 is formed on the second surface SWb of the semiconductor wafer SW. For example, the redistribution structure 600 is formed over the semiconductor substrate 110 opposite to the insulation layer 120. In some embodiments, the redistribution structure 600 includes a dielectric layer 602, a plurality of redistribution conductive layers 604, and a plurality of conductive vias 606. For simplicity, the dielectric layer 602 is illustrated as a bulky layer in FIG. 1F, but it should be understood that the dielectric layer 602 may be constituted by multiple dielectric layers. The redistribution conductive layers 604 and the dielectric layers of the dielectric layer 602 are stacked alternately. The redistribution conductive layers 604 are interconnected with one another by conductive vias 606 embedded in the dielectric layers 602. In some embodiments, a material of the redistribution conductive layers 604 and the conductive vias 606 includes aluminum, titanium, copper, nickel, tungsten, and/or alloys thereof. The redistribution conductive layers 604 may be formed by, for example, electroplating, deposition, and/or photolithography and etching. In some embodiments, a material of the dielectric layers 602 includes polyimide, epoxy resin, acrylic resin, phenol resin, benzocyclobutene (BCB), polybenzoxazole (PBO), or other suitable polymer-based dielectric materials. The dielectric layer 602, for example, may be formed by suitable fabrication techniques such as spin-on coating, CVD, PECVD, or the like. In some embodiments, the redistribution structure 600 is formed such that the redistribution conductive layers 604 are electrically connected to the through vias 160 of the semiconductor wafer SW.

Figure 1G:
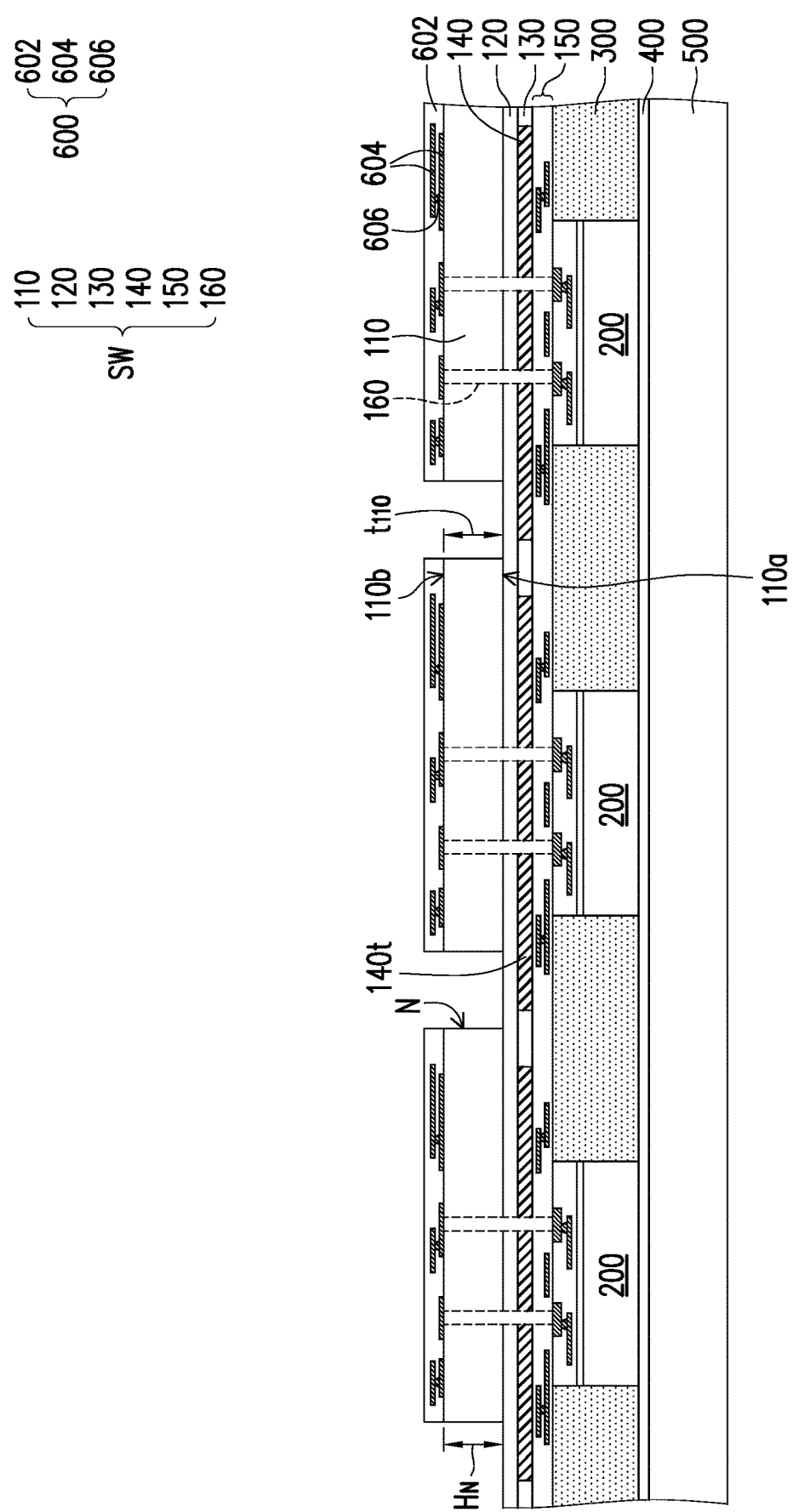

Referring to FIG. 1G, a portion of the redistribution structure 600 and a portion of the semiconductor substrate 110 are removed. In some embodiments, the portion of the redistribution structure 600 and the portion of the semiconductor substrate 110 are removed by two distinct steps. For example, the portion of the redistribution structure 600 is first removed to expose the underlying semiconductor substrate 110. Thereafter, the semiconductor substrate 110 exposed by the redistribution structure 600 is removed. In some embodiments, the portion of the redistribution structure 600 and the exposed semiconductor substrate 110 are removed through two different etching processes. The etching processes include, for example, an anisotropic etching process such as dry etch or an isotropic etching process such as wet etch. In some embodiments, an etchant for the wet etch includes a combination of hydrogen fluoride (HF), copper (Cu), and ammonia ($NH_3$), a combination of HF and TMAH, or the like. On the other hand, the dry etch process includes, for example, reactive ion etch (RIE), inductively coupled plasma (ICP) etch, transformer coupled plasma (TCP) etch, electron cyclotron resonance (ECR) etch, neutral beam etch (NBE), and/or the like. In some embodiments, the portion of the redistribution structure 600 being removed may be free of the redistribution conductive layers 604 and the conductive vias 606. In other words, the portion of the redistribution structure 600 being removed only includes the dielectric layer 602. However, the disclosure is not limited thereto. In some alternative embodiments, portions of the dielectric layer 602, portions of the redistribution conductive layers 604, and portions of the conductive vias 606 may be removed together. Although the portion of the redistribution structure 600 and the portion of the semiconductor substrate 110 may be removed by two different process, the disclosure is not limited thereto. In some alternative embodiments, the portion of the redistribution structure 600 and the portion of the semiconductor substrate 110 may be removed by one single step (i.e. one single process) depending on the selectivity of the etchant.

In some embodiments, the insulation layer 120 underneath the semiconductor substrate 110 may serve as an etch stop layer to prevent the etching process from damaging other components underneath the semiconductor substrate 110 and the insulation layer 120. In some embodiments, the insulation layer 120 may be slightly etched. Upon removal of portions of the semiconductor substrate 110, a plurality of notches N is formed in the semiconductor substrate 110. In some embodiments, the notches N have straight sidewalls. However, the disclosure is not limited thereto. In some alternative embodiments, the notches N have curved sidewalls. As illustrated in FIG. 1G, heights HN of the notches N are substantially equal to a thickness $t_{110}$ of the semiconductor substrate 110. In other words, the etching process etches through the semiconductor substrate 110 along a thickness direction, and the notches N penetrate through the semiconductor substrate 110. The configurations of the notches N will be discussed below in conjunction with FIG. 2A.

Figure 2A:
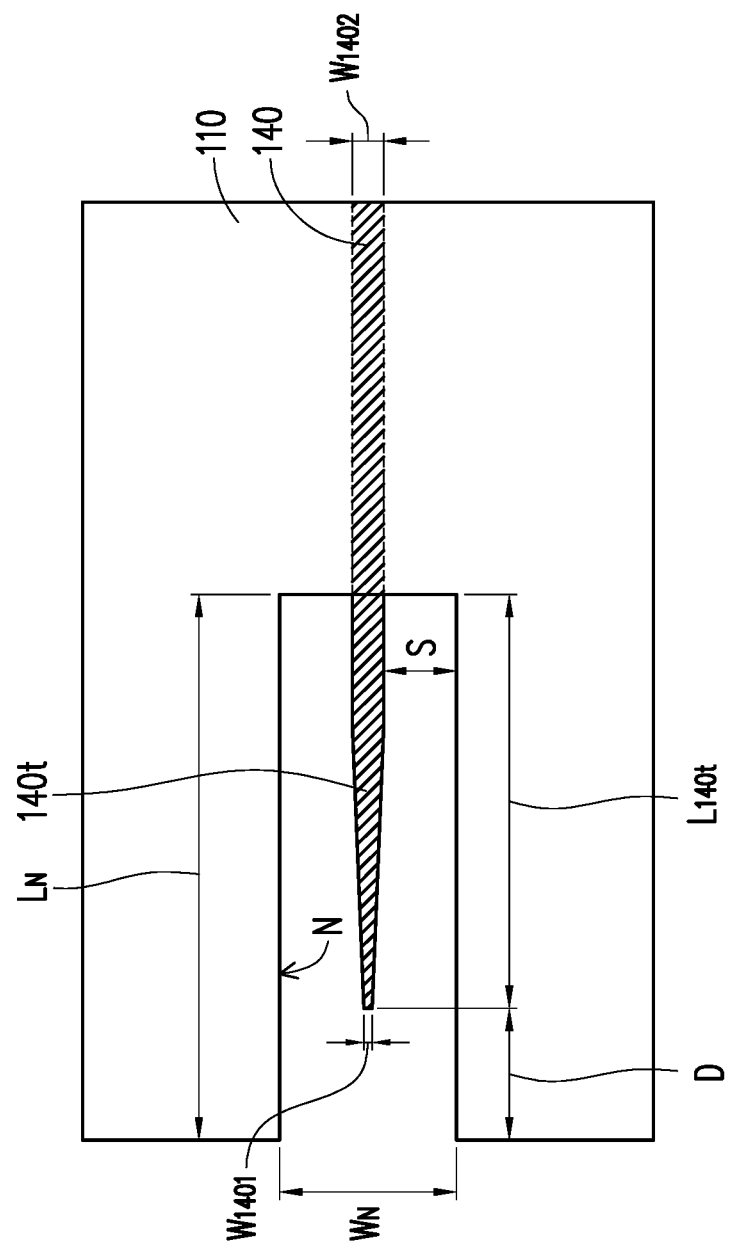
FIG. 2A is a schematic partial top view of the semiconductor substrate and the waveguide in FIG. 1G in accordance with some embodiments of the disclosure.

FIG. 2A is a schematic partial top view of the semiconductor substrate 110 and the waveguide 140 in FIG. 1G in accordance with some embodiments of the disclosure. For simplicity, the redistribution structure 600, the insulation layer 120, and the through vias 160 in FIG. 1G are omitted in FIG. 2A. Referring to FIG. 1G and FIG. 2A, the notch N of the semiconductor substrate 110 is formed corresponding to at least a portion of the waveguide 140. For example, the notch N is formed directly above at least a portion of the waveguide 140. In some embodiments, a location of the notch N corresponds to a tip 140t of the waveguide 140. That is, a projection of the notch N along a direction perpendicular to the first surface 110a of the semiconductor substrate 110 is overlapped with the tip 140t of the waveguide 140. In some embodiments, from the top view, the tip 140t of the waveguide 140 is located within the boundary of the notch N of the semiconductor substrate 110.

As illustrated in FIG. 2A, the notch N exhibits a rectangular shape from the top view. For example, a width $W_N$ of the notch N is uniform. In some embodiments, the width $W_N$ of the notch N ranges from about 10 μm to about 20 μm. On the other hand, a length LN of the notch N may range from about 100 μm to about 300 μm. In some embodiments, a width of the waveguide 140 is not uniform. For example, the waveguide 140 has a smaller width $W_{1401}$ at the tip 140t. In some embodiments, a minimum width $W_{1401}$ of the waveguide 140 at the tip 140t is about 50 nm to about 100 nm, and a maximum width $W_{1402}$ of the waveguide 140 is about 130 nm to about 260 nm. In some embodiments, a length $L_{140t}$ of the tip 140t of the waveguide 140 located within the boundary of the notch N ranges from about 100 μm to about 300 μm. On the other hand, a distance D between an end of the tip 140t and a virtual line extending from an edge of the semiconductor substrate 110 shown in FIG. 2A ranges from about 10 μm to about 2 μm. Moreover, a spacing S between the tip 140t of the waveguide 140 and a sidewall of the notch N ranges from about 5 μm to about 10 μm.

As mentioned above, the waveguides 140 are able to transmit optical signals entering from the lateral side. When the optical signal is transmitted to the waveguide 140 from the lateral side, the region above and/or below the tip 140t of the waveguide 140 is preferably to be free of semiconductor material, so as to prevent the semiconductor material from generating optical absorption noise. For example, if semiconductor material exists in the region above and/or below the tip 140t of the waveguide 140, the semiconductor material would absorb some of the optical signals, thereby causing optical signal loss when entering or transmitting through the waveguide 140. In some embodiments, the length LN of the notch N is inversely proportional to the cross-sectional area of the tip 140t of the waveguide 140. For example, when the cross-sectional area of the tip 140t of the waveguide 140 is very small, it is difficult for the tip 140t of the waveguide 140 to receive optical signals. As such, the length LN of the notch N is required to be longer (i.e. larger region is free of semiconductor material) to compensate for the small optical reception ability of the waveguide 140. Referring to FIG. 1G and FIG. 2A, since the notch N is formed above the tip 140t of the waveguide 140, the region directly above the tip 140t of the waveguide 140 is being occupied by air, and is free of semiconductor material. As such, the noise originated from the semiconductor material (i.e. the semiconductor substrate 110) may be eliminated, thereby enhancing the signal accuracy of the optical signals received and transmitted by the waveguide 140.

It should be noted that the shape and the dimension of the notch N illustrated in FIG. 2A merely serve as exemplary illustrations, and the disclosure is not limited thereto. Other configurations of the notch N will be discussed below in conjunction with FIG. 2B and FIG. 2C.

Figure 2B:
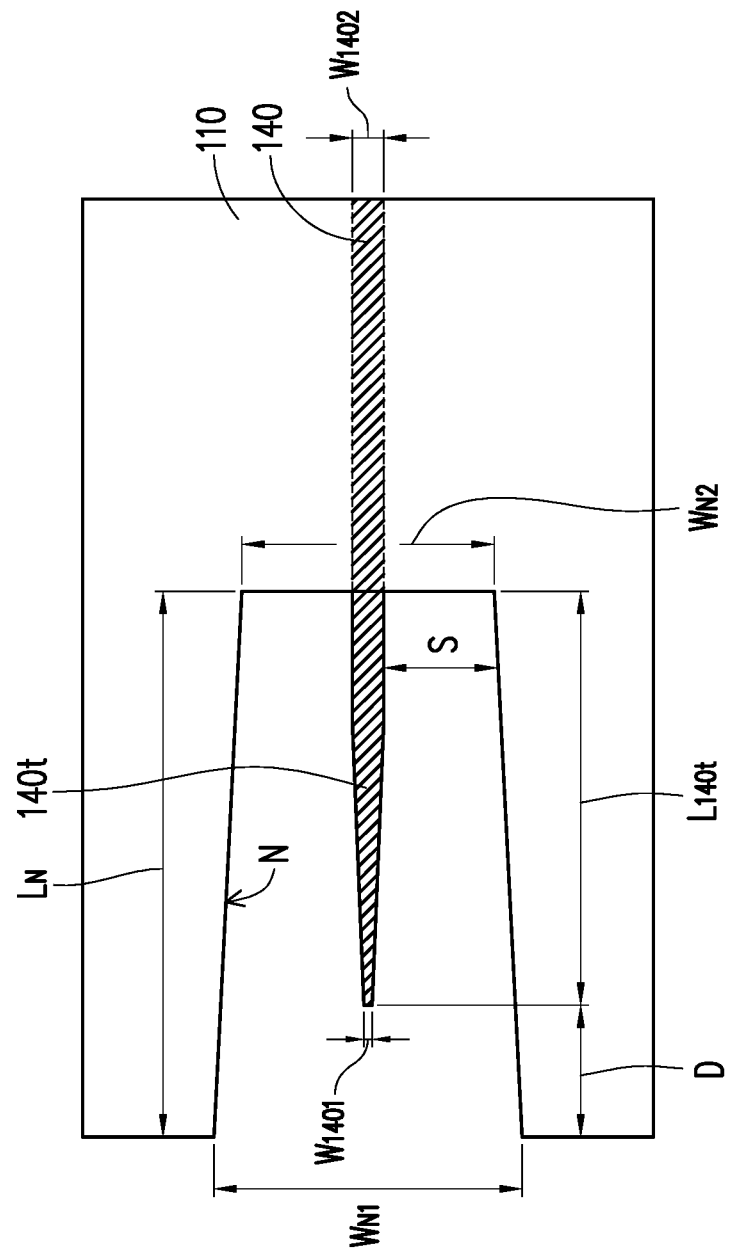
FIG. 2B is a schematic partial top view of the semiconductor substrate and the waveguide in FIG. 1G in accordance with some alternative embodiments of the disclosure.

FIG. 2B is a schematic partial top view of the semiconductor substrate 110 and the waveguide 140 in FIG. 1G in accordance with some alternative embodiments of the disclosure. For simplicity, the redistribution structure 600, the insulation layer 120, and the through vias 160 in FIG. 1G are omitted in FIG. 2B. As illustrated in FIG. 2B, the notch N exhibits a trumpet-like shape from an interior toward an edge of the semiconductor substrate 110 in the top view. For example, a width of the notch N gradually decreases from an edge of the semiconductor substrate 110 toward an interior of the semiconductor substrate 110. In some embodiments, the notch N has a maximum width $W_{N1}$ of about 15 μm to about 30 μm and a minimum width $W_{N2}$ of about 10 μm to about 20 μm. On the other hand, a length LN of the notch N may range from about 100 μm to about 300 μm. In some embodiments, a width of the waveguide 140 is not uniform. For example, the waveguide 140 has a smaller width $W_{1401}$ at the tip 140t. In some embodiments, a minimum width $W_{1401}$ of the waveguide 140 at the tip 140t is about 50 nm to about 100 nm, and a maximum width $W_{1402}$ of the waveguide 140 is about 130 nm to about 260 nm. In some embodiments, a length $L_{140t}$ of the tip 140t of the waveguide 140 located within the boundary of the notch N ranges from about 100 μm to about 300 μm. On the other hand, a distance D between an end of the tip 140t and a virtual line extending from an edge of the semiconductor substrate 110 shown in FIG. 2B ranges from about 10 μm to about 2 μm. Moreover, a spacing S between the tip 140t of the waveguide 140 and a sidewall of the notch N ranges from about 5 μm to about 10 μm.

As mentioned above, the waveguides 140 are able to transmit optical signals entering from the lateral side. When the optical signal is transmitted to the waveguide 140 from the lateral side, the region above and/or below the tip 140t of the waveguide 140 is preferably to be free of semiconductor material, so as to prevent the semiconductor material from generating optical absorption noise. Referring to FIG. 1G and FIG. 2B, since the notch N is formed above the tip 140t of the waveguide 140, the region directly above the tip 140t of the waveguide 140 is being occupied by air, and is free of semiconductor material. Moreover, the trumpet-like shape of the notch N shown in FIG. 2B provides extra margin to ensure more clearance of the semiconductor material above the tip 140t of the waveguide 140. As such, the noise originated from the semiconductor material (i.e. the semiconductor substrate 110) may be eliminated, thereby enhancing the signal accuracy of the optical signals received and transmitted by the waveguide 140.

Figure 2C:
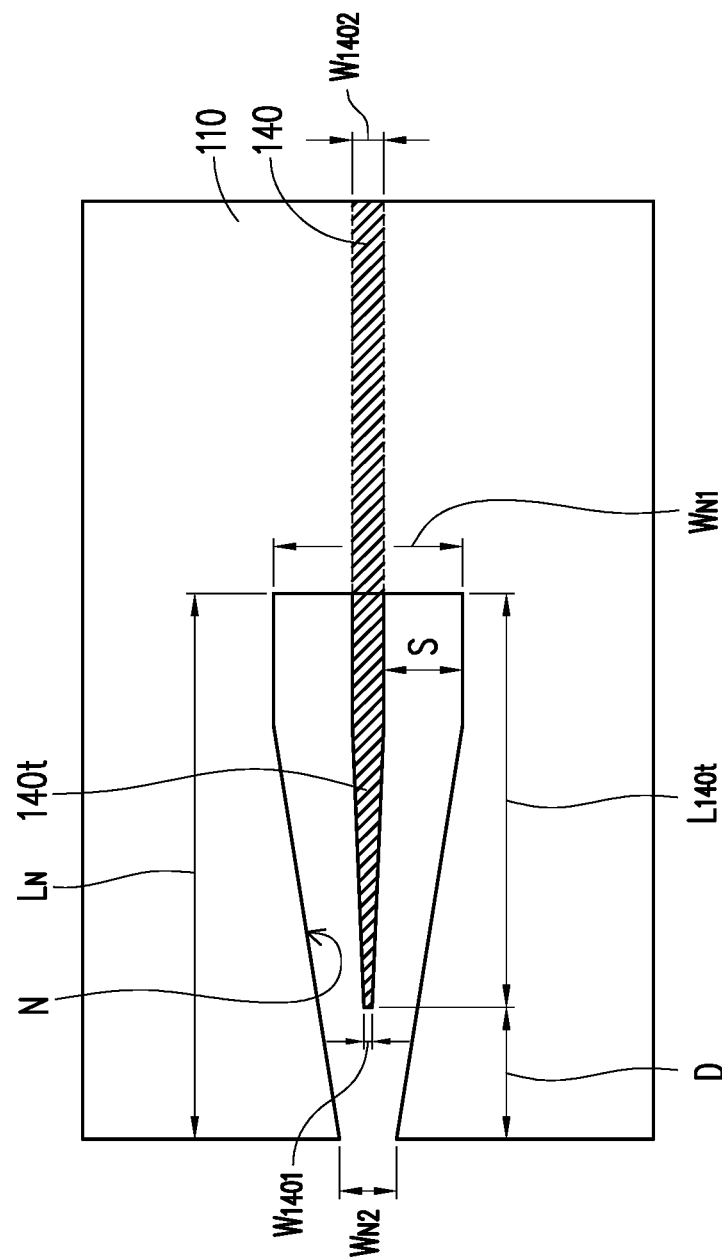
FIG. 2C is a schematic partial top view of the semiconductor substrate and the waveguide in FIG. 1G in accordance with some alternative embodiments of the disclosure.

FIG. 2C is a schematic partial top view of the semiconductor substrate 110 and the waveguide 140 in FIG. 1G in accordance with some alternative embodiments of the disclosure. For simplicity, the redistribution structure 600, the insulation layer 120, and the through vias 160 in FIG. 1G are omitted in FIG. 2C. As illustrated in FIG. 2C, the notch N exhibits a trumpet-like shape from an edge toward an interior of the semiconductor substrate 110 in the top view. For example, a width of the notch N gradually increases from an edge of the semiconductor substrate 110 toward an interior of the semiconductor substrate 110. In some embodiments, the notch N has a maximum width $W_{N1}$ of about 10 μm to about 20 μm and a minimum width $W_{N2}$ of about 9 μm to about 18 μm. On the other hand, a length LN of the notch N may range from about 100 μm to about 300 μm. In some embodiments, a width of the waveguide 140 is not uniform. For example, the waveguide 140 has a smaller width $W_{1401}$ at the tip 140t. In some embodiments, a minimum width $W_{1401}$ of the waveguide 140 at the tip 140t is about 50 nm to about 100 nm, and a maximum width $W_{1402}$ of the waveguide 140 is about 130 nm to about 260 nm. In some embodiments, a length $L_{140t}$ of the tip 140t of the waveguide 140 located within the boundary of the notch N ranges from about 100 μm to about 300 μm. On the other hand, a distance D between an end of the tip 140t and a virtual line extending from an edge of the semiconductor substrate 110 shown in FIG. 2B ranges from about 10 μm to about 2 μm. Moreover, a spacing S between the tip 140t of the waveguide 140 and a sidewall of the notch N ranges from about 5 μm to about 10 μm. As illustrated in FIG. 2C, a contour of the notch N may be conformal with a contour of the tip 140t of the waveguide 140. In some embodiments, the width of a portion of the notch N varies while the width of another portion of the notch remains constant. For example, the width of the notch N may gradually increase from an edge of the semiconductor substrate 110 toward an interior of the semiconductor substrate 110 until certain point. Thereafter, the width of the notch N remains constant, as shown in FIG. 2C.

As mentioned above, the waveguides 140 are able to transmit optical signals entering from the lateral side. When the optical signal is transmitted to the waveguide 140 from the lateral side, the region above and/or below the tip 140t of the waveguide 140 is preferably to be free of semiconductor material, so as to prevent the semiconductor material from generating optical absorption noise. Referring to FIG. 1G and FIG. 2C, since the notch N is formed above the tip 140t of the waveguide 140, the region directly above the tip 140t of the waveguide 140 is being occupied by air, and is free of semiconductor material. Moreover, since the trumpet-like shape shown in FIG. 2C is conformal with the shape of the tip 140t of the waveguide 140, the area penalty may be minimized (i.e. the removal of the semiconductor substrate 110 may be kept at minimum). As such, the noise originated from the semiconductor material (i.e. the semiconductor substrate 110) may be eliminated, thereby enhancing the signal accuracy of the optical signals received and transmitted by the waveguide 140.

Figure 1H:
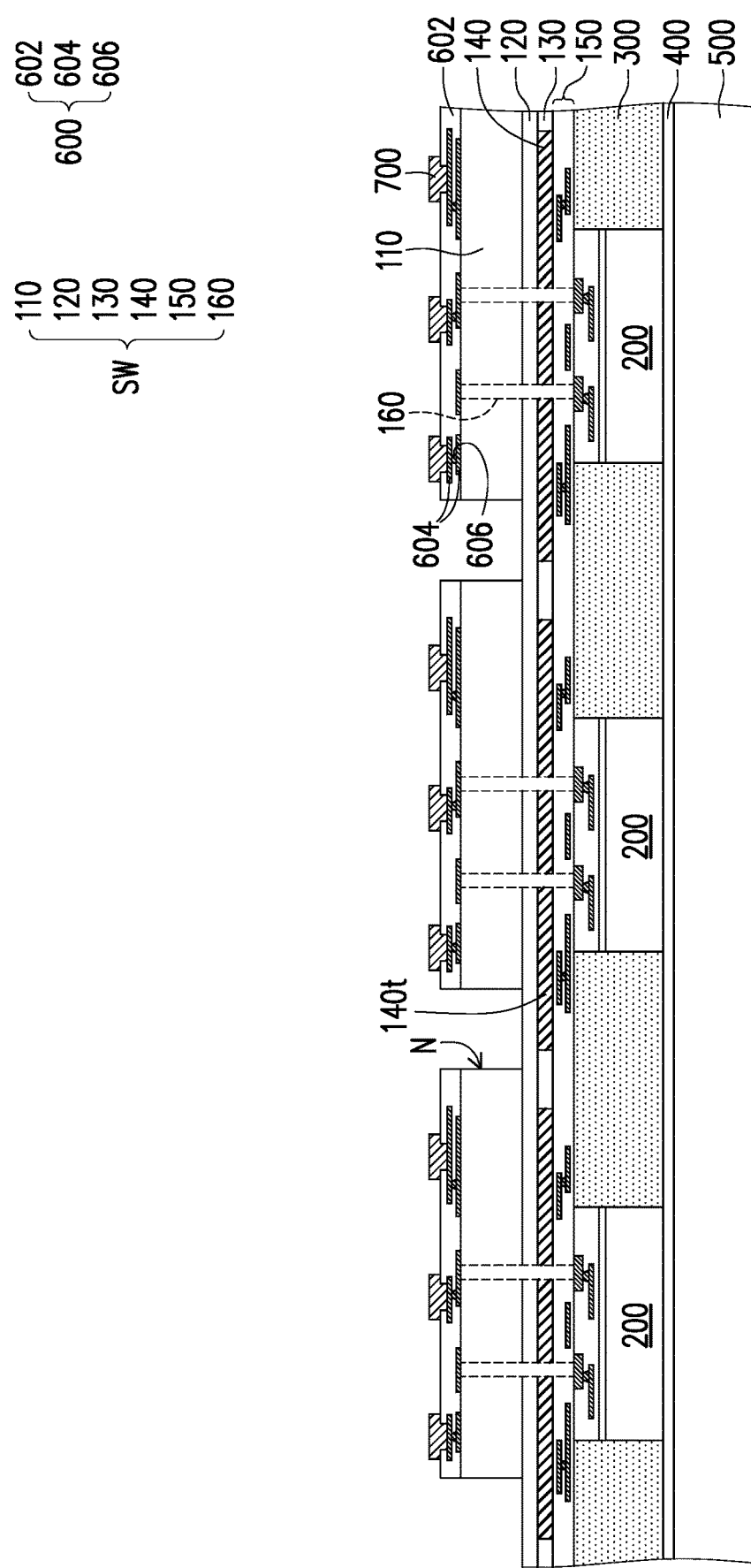

Referring to FIG. 1H, a plurality of conductive pads 700 is formed over the redistribution structure 600. In some embodiments, the conductive pads 700 are partially embedded in the dielectric layer 602 of the redistribution structure 600. For example, a plurality of openings is formed in the dielectric layer 602 to expose the topmost redistribution conductive layer 604, and the conductive pads 700 extend into the openings of the dielectric layer 602 to render electrical connection with the redistribution conductive layer 604. In some embodiments, a material of the conductive pads 700 includes aluminum, titanium, copper, nickel, tungsten, and/or alloys thereof. In some embodiments, the conductive pads 700 may be formed by electroplating, deposition, and/or photolithography and etching. In some embodiments, the conductive pads 700 may be referred to as "under-ball metallurgy (UBM) patterns."

As illustrated in FIG. 1G and FIG. 1H, the conductive pads 700 are formed after the removal of the portion of the semiconductor substrate 110. However, the disclosure is not limited thereto. In some alternative embodiments, the conductive pads 700 may be formed prior to the removal of the portion of the semiconductor substrate 110. When the conductive pads 700 are formed prior to the removal of portions of the redistribution structure 600 and the semiconductor substrate 110 (shown in FIG. 1G), a photoresist layer (not shown) may be formed to cover the conductive pads 700, so as to prevent the conductive pads 700 from being damaged by the etching process.

Figure 1I:
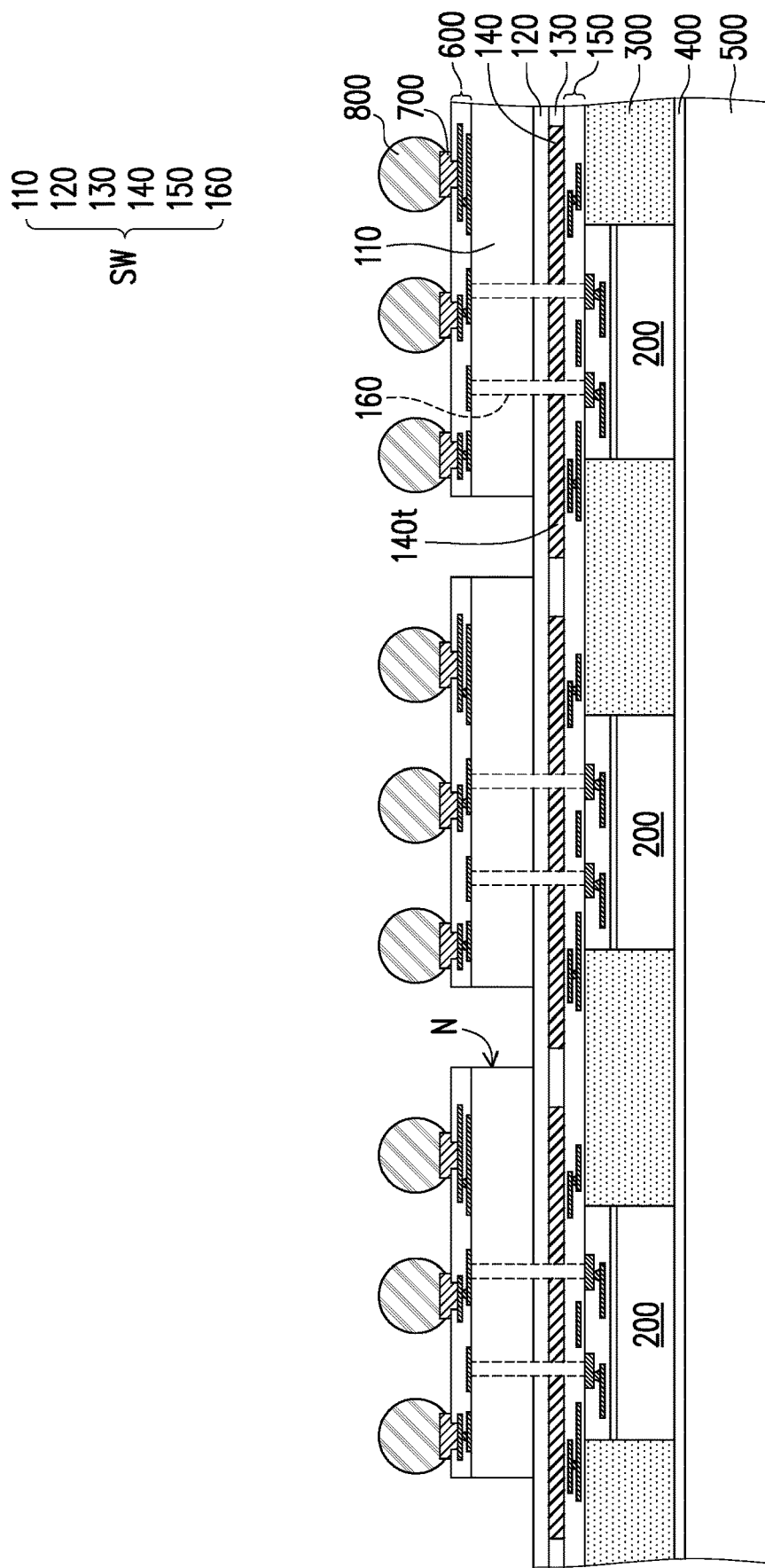

Referring to FIG. 1I, a plurality of conductive terminals 800 is formed over the conductive pads 700. The conductive terminals 800 may include a conductive material such as solder, copper, aluminum, gold, nickel, silver, palladium, tin, a combination thereof, or the like. The conductive terminals 800 may be or may include controlled collapse chip connection (C4) bumps, metal pillars, micro-bumps, ball grid array (BGA), solder balls, electroless nickel-electroless palladium-immersion gold (ENEPIG) formed bumps, and/or the like. In some embodiments, the conductive terminals 800 are formed by forming a layer of solder through evaporation, plating, printing, ball placement, or the like. A reflow process is optionally performed to shape the layer of solder into the desired bump shapes. In some alternative embodiments, the conductive terminals 800 are metal pillars (e.g., a copper pillar) formed by sputtering, printing, plating, CVD, or the like. The conductive terminals 800 formed as metal pillars may be free of solder and have substantially vertical sidewalls. In some embodiments, a metal cap layer (not shown) is formed on the tops of the conductive terminals 800. The metal cap layer may include nickel, tin, tin-lead, gold, silver, palladium, indium, nickel-palladium-gold, nickel-gold, the like, or a combination thereof.

Figure 1J:
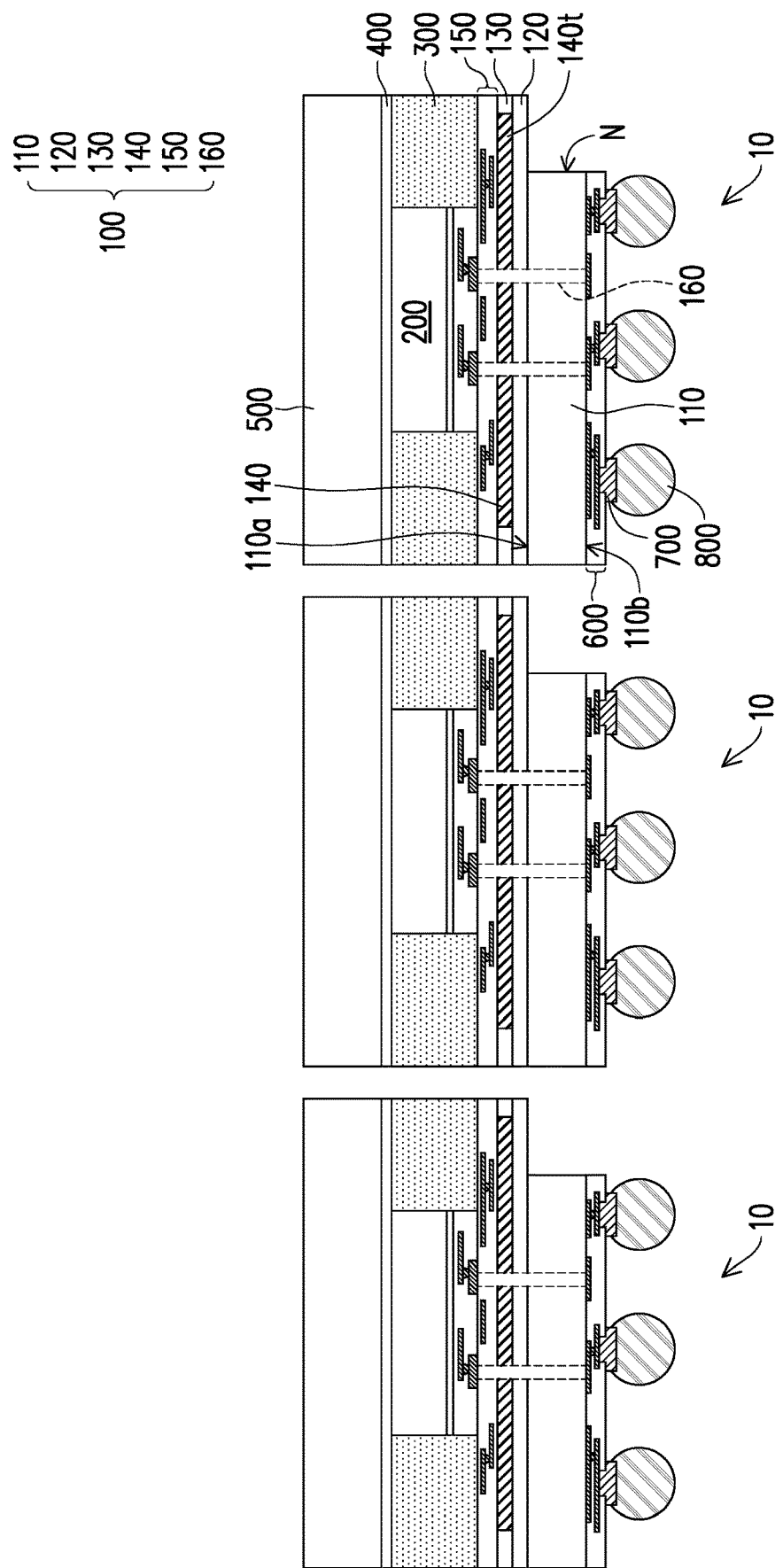

Referring to FIG. 1I and FIG. 1J, a singulation process is performed on the structure illustrated in FIG. 1I to obtain a plurality of packages 10. That is, the redistribution structure 600, the semiconductor wafer SW, the encapsulant 300, the bonding layer 400, and the supporting substrate 500 are singulated. In some embodiments, the dicing process or the singulation process typically involves dicing with a rotating blade or a laser beam. In other words, the dicing or singulation process is, for example, a laser cutting process, a mechanical cutting process, or other suitable processes.

In some embodiments, during the singulation process, the semiconductor wafer SW is divided into a plurality of photonic integrated circuit dies 100. As illustrated in FIG. 1J, each package 10 includes the photonic integrated circuit die 100, the electric integrated circuit die 200, the encapsulant 300, the bonding layer 400, the supporting substrate 500, the redistribution structure 600, the conductive pads 700, and the conductive terminals 800. The photonic integrated circuit die 100 includes the semiconductor substrate 110, the insulation layer 120, the dielectric layer 130, the waveguide 140, the interconnection structure 150, and the through vias 160. The semiconductor substrate 110 has the first surface 110a and the second surface 110b opposite to the first surface 110a. The insulation layer 120, the waveguide 140, and the interconnection structure 150 are sequentially disposed on the first surface 110a of the semiconductor substrate 110. On the other hand, the dielectric layer 130 laterally wraps around the waveguide 140. In some embodiments, the through vias 160 penetrate through the semiconductor substrate 110, the insulation layer 120, the dielectric layer 130, and the interconnection structure 150 to electrically connect with the electric integrated circuit die 200. The notch N is formed in the semiconductor substrate 110. As illustrated in FIG. 1J, the notch N of the semiconductor substrate 110 is underneath at least a portion of the waveguide 140. For example, a projection of the tip 140t of the waveguide 140 along a direction perpendicular to the first surface 110a of the semiconductor substrate 110 is overlapped with the notch N. In some embodiments, the electric integrated circuit die 200 is disposed over and electrically connected to the photonic integrated circuit die 100. The encapsulant 300 laterally encapsulates the electric integrated circuit die 200. In some embodiments, the bonding layer 400 and the supporting substrate 500 are sequentially stacked over the electric integrated circuit die 200 and the encapsulant 300. On the other hand, the redistribution structure 600, the conductive pads 700, and the conductive terminals 800 are sequentially disposed over the second surface 110b of the semiconductor substrate 110.

Figure 1K:
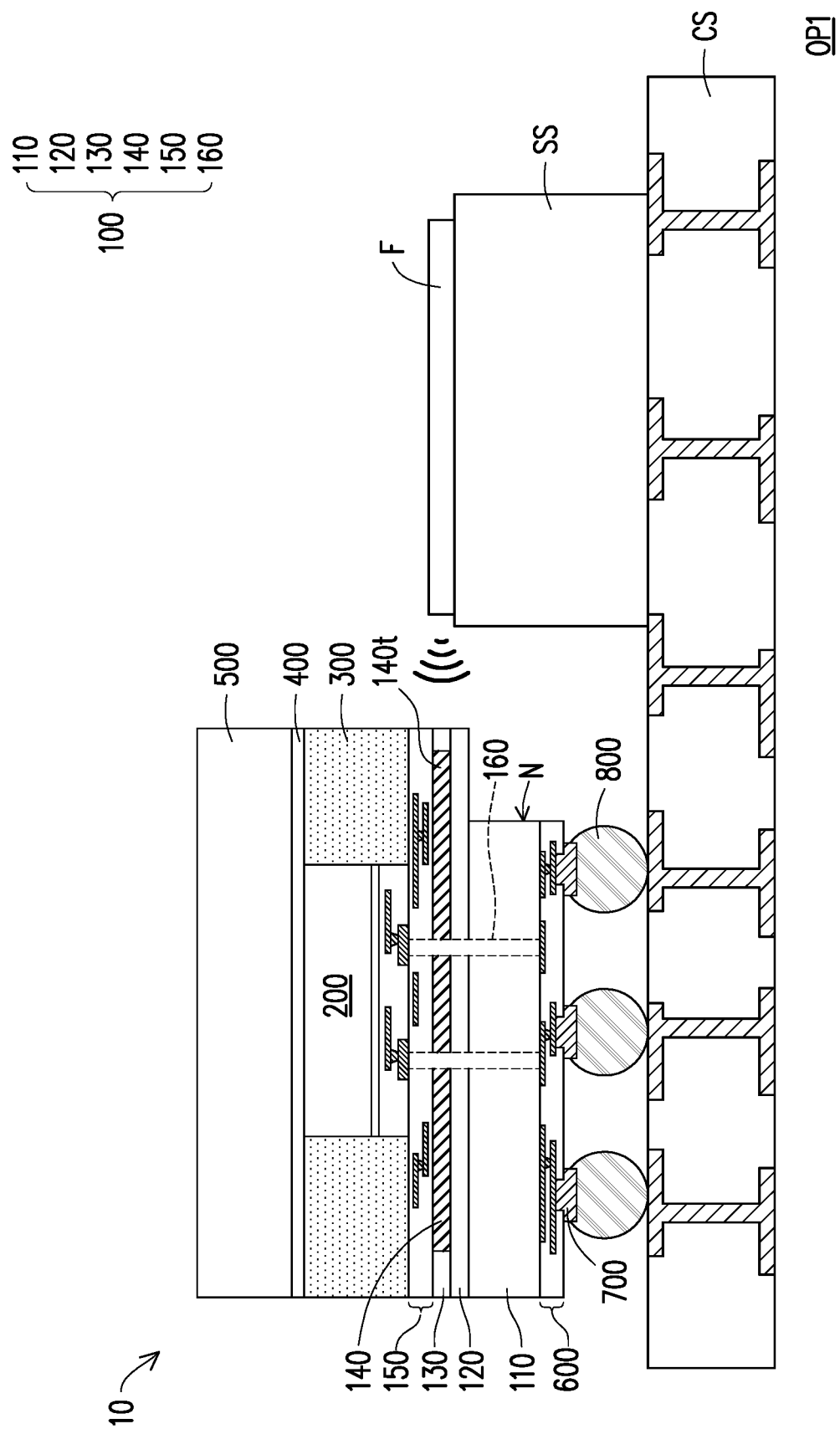

Referring to FIG. 1K, the package 10 may be assembled with other components to form an optical device OP1. As illustrated in FIG. 1K, the optical device OP1 includes the package 10, a circuit substrate CS, a supporting structure SS, and an optical fiber F. In some embodiments, the package 10 is mounted onto the circuit substrate CS. In some embodiments, the circuit substrate CS includes a printed circuit board (PCB) or the like. In some embodiments, the package 10 is electrically connected to the circuit substrate CS through the conductive terminals 800. For example, the conductive terminals 800 of the package 10 are directly in contact with the wiring of the circuit substrate 1000 to render electrical connection. In some embodiments, after the package 10 is attached to the circuit substrate CS, a reflow process is performed on the conductive terminals 800 to strengthen the attachment between the conductive terminals 800 and the circuit substrate CS.

In some embodiments, the supporting structure SS is disposed on the circuit substrate CS. For example, the supporting structure SS is disposed adjacent to the package 10. In some embodiments, the optical fiber F is disposed on the supporting structure SS. That is, the supporting structure SS provides a platform to securely fix the optical fiber F in place. In some embodiments, the optical fiber F is disposed to be adjacent to the photonic integrated circuit die 100 of the package 10. For example, the optical fiber F is disposed adjacent to the waveguide 140 of the photonic integrated circuit die 100. In some embodiments, the optical fiber F is optically coupled to the waveguide 140, so as to enable exchange of optical signals between the photonic integrated circuit die 100 and the optical fiber F. In some embodiments, the optical fiber F is aligned with the waveguide 140 to ensure minimum optical signal loss. As mentioned above, when the optical signals from the optical fiber F is transmitted to the waveguide 140 of the photonic integrated circuit die 100, the region underneath the tip 140t of the waveguide 140 is preferably to be free of semiconductor material, so as to reduce the noise originated from such material. As illustrated in FIG. 1K, since the notch N is formed directly below the tip 140t of the waveguide 140, the region directly underneath the tip 140t of the waveguide 140 is being occupied by air, and is free of semiconductor material. As such, the noise originated from the semiconductor material (i.e. the semiconductor substrate 110) may be eliminated, thereby enhancing the signal accuracy of the optical signals received and transmitted by the waveguide 140. It should be noted that although FIG. 1K illustrated that the notch N is being occupied by air, the disclosure is not limited thereto. In some alternative embodiments, the notch N may be filled with a low optical absorption dielectric material, and the signal accuracy of the optical signals received and transmitted by the waveguide 140 may still be ensured.

Figure 3:
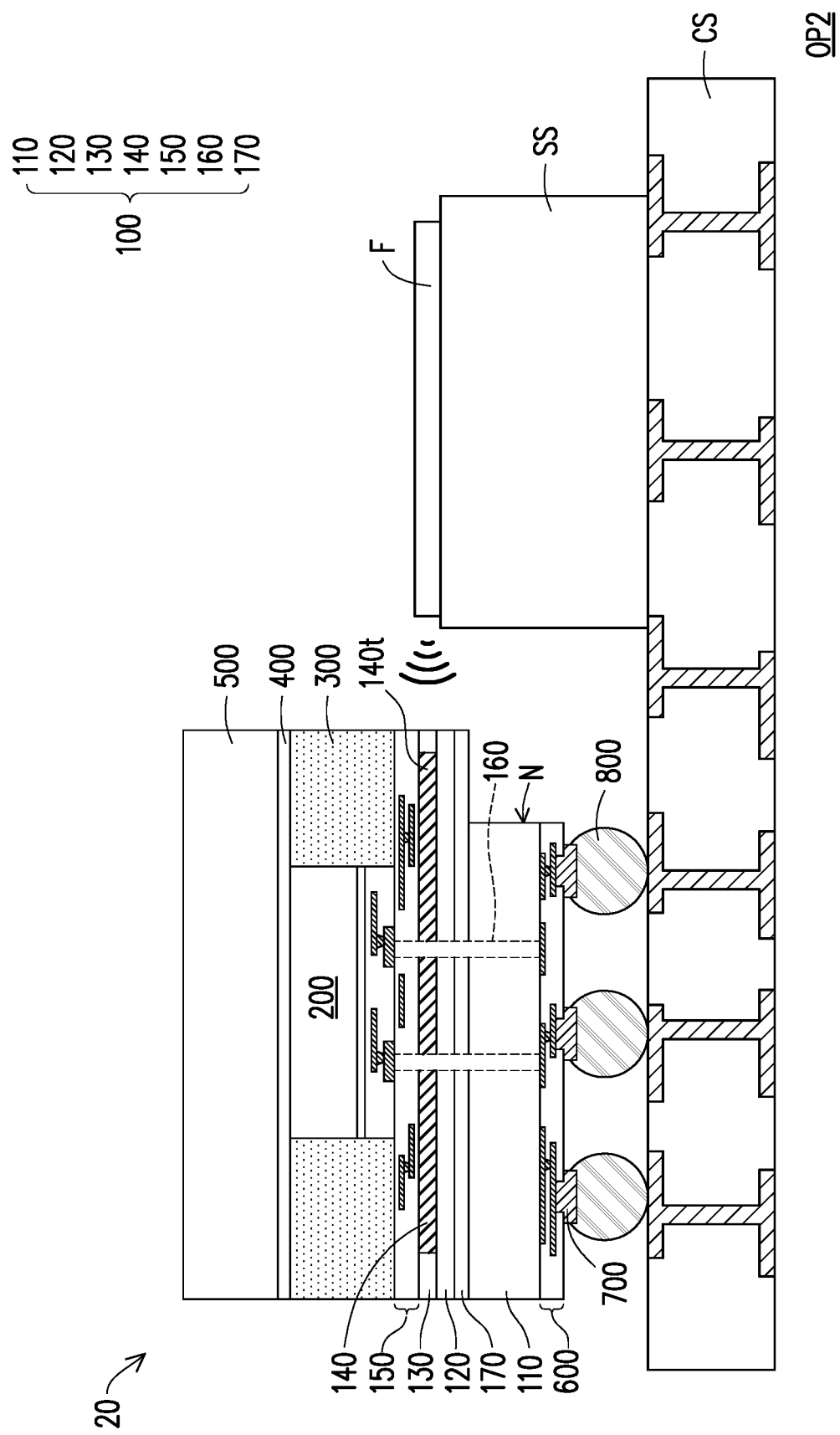
FIG. 3 is a schematic cross-sectional view illustrating an optical device in accordance with some alternative embodiments of the disclosure.

FIG. 3 is a schematic cross-sectional view illustrating an optical device OP2 in accordance with some alternative embodiments of the disclosure. Referring to FIG. 3, the optical device OP2 in FIG. 3 is similar to the optical device OP1 in FIG. 1K, so similar elements are denoted by the same reference numeral and the detailed descriptions thereof are omitted herein. The difference between the optical device OP2 in FIG. 3 and the optical device OP1 in FIG. 1K lies in that the package 10 in FIG. 1K is replaced by a package 20 in FIG. 3. The package 20 in FIG. 3 is similar to the package 10 in FIG. 1K except the photonic integrated circuit die 100 of the package 20 further includes an etch stop layer 170. As illustrated in FIG. 3, the etch stop layer 170 is sandwiched between the semiconductor substrate 110 and the insulation layer 120. In some embodiments, a material of the etch stop layer 170 includes silicon nitride or the like. As mentioned above, during the manufacturing process of the packages, a portion of the semiconductor substrate 110 is removed to form the notch N (shown in FIG. 1G). The etch stop layer 170 is able to prevent the etchant from damaging the underlying layer during removal of the semiconductor substrate 110 when forming the notch N. In some embodiments, during the etching process shown in FIG. 1G, the etch stop layer 170 may be slightly etched.

Figure 4:
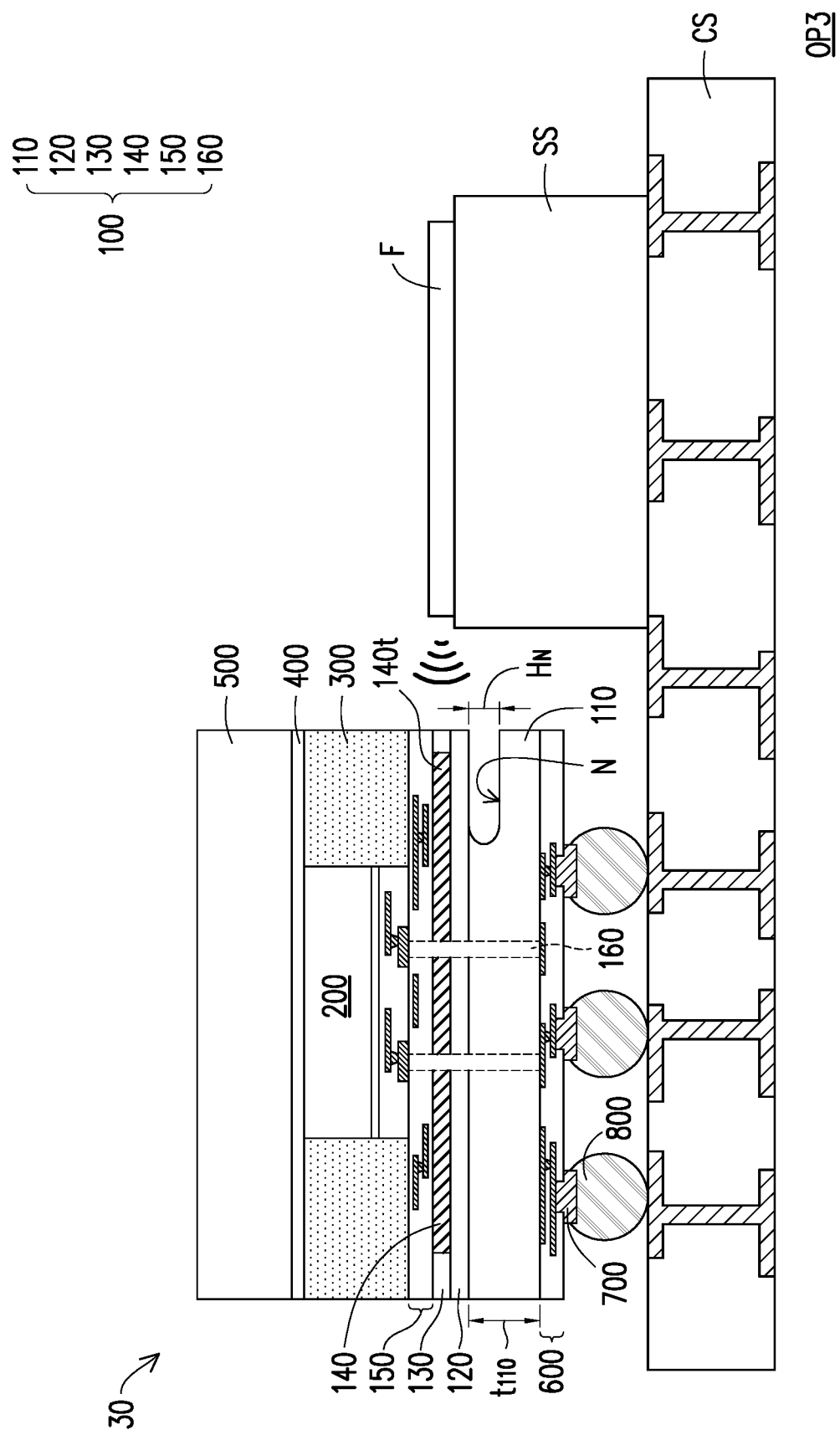
FIG. 4 is a schematic cross-sectional view illustrating an optical device in accordance with some alternative embodiments of the disclosure.

FIG. 4 is a schematic cross-sectional view illustrating an optical device OP3 in accordance with some alternative embodiments of the disclosure. Referring to FIG. 4, the optical device OP3 in FIG. 4 is similar to the optical device OP1 in FIG. 1K, so similar elements are denoted by the same reference numeral and the detailed descriptions thereof are omitted herein. The difference between the optical device OP3 in FIG. 4 and the optical device OP1 in FIG. 1K lies in that the package 10 in FIG. 1K is replaced by a package 30 in FIG. 4. The package 30 in FIG. 4 is similar to the package 10 in FIG. 1K except the notch N does not penetrate through the semiconductor substrate 110 in the package 30. For example, the notch N may be an undercut directly underneath the tip 140t of the waveguide 140. As illustrated in FIG. 4, the notch N has a curved sidewall. Since the notch N does not penetrate through the semiconductor substrate 110, a height HN of the notch N is smaller than a thickness $t_{110}$ of the semiconductor substrate 110. In some embodiments, the height HN of the notch N ranges from about 10 μm to about 50 μm. As illustrated in FIG. 4, since the notch N is formed below the tip 140t of the waveguide 140, the proximal region directly underneath the tip 140t of the waveguide 140 is being occupied by air, and is free of semiconductor material. As such, the noise originated from the semiconductor material (i.e. the semiconductor substrate 110) may be eliminated, thereby enhancing the signal accuracy of the optical signals received and transmitted by the waveguide 140.

In accordance with some embodiments of the disclosure, a package includes a photonic integrated circuit die, an electric integrated circuit die, and an encapsulant. The photonic integrated circuit die includes a semiconductor substrate, an insulation layer, and a waveguide. The semiconductor substrate has a notch. The insulation layer is disposed on the semiconductor substrate. The waveguide is disposed on the insulation layer. The notch of the semiconductor substrate is underneath at least a portion of the waveguide. The electric integrated circuit die is disposed over and electrically connected to the photonic integrated circuit die. The encapsulant laterally encapsulates the electric integrated circuit die.

In accordance with some embodiments of the disclosure, an optical device includes a circuit substrate and a package. The package is disposed on the circuit substrate. The package includes a photonic integrated circuit die and an electric integrated circuit die. The photonic integrated circuit die includes a semiconductor substrate, an insulation layer, and a waveguide. The semiconductor substrate has a first surface and a second surface opposite to the first surface. The semiconductor substrate includes a notch. The insulation layer is disposed on the first surface of the semiconductor substrate. The waveguide is disposed on the insulation layer. A projection of a tip of the waveguide along a direction perpendicular to the first surface of the semiconductor substrate is overlapped with the notch. The electric integrated circuit die is disposed over and electrically connected to the photonic integrated circuit die.

In accordance with some embodiments of the disclosure, a manufacturing method of a package includes at least the following steps. A semiconductor wafer including a semiconductor substrate, an insulation layer, waveguides, and an interconnection structure stacked in sequential order is provided. An electric integrated circuit die is bonded to the semiconductor wafer. The electric integrated circuit die is laterally encapsulated by an encapsulant. A redistribution structure is formed over the semiconductor substrate opposite to the insulation layer. A portion of the semiconductor substrate is removed to form notches in the semiconductor substrate. Conductive pads are formed over the redistribution structure. Conductive terminals are formed over the conductive pads.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A package, comprising:
 a photonic integrated circuit die, comprising:
  a substrate having a notch, wherein the notch is occupied by air, and the notch extends from an interior of the substrate to an end edge of the substrate; and
  a waveguide disposed over the substrate and outside of the notch, wherein in a top view, a first portion of the waveguide is overlapped with the substrate and a second portion of the waveguide is overlapped with the notch; and
 an electric integrated circuit die disposed over the photonic integrated circuit die.
2. The package of claim 1, further comprising a supporting substrate over the electric integrated circuit die.

3. The package of claim 1, wherein the photonic integrated circuit die further comprises an etch stop layer located between the substrate and the waveguide.

4. The package of claim 1, wherein a height of the notch is equal to a thickness of the substrate.

5. The package of claim 1, wherein a height of the notch is smaller than a thickness of the substrate.

6. The package of claim 1, wherein the photonic integrated circuit die further comprises through vias penetrating through the substrate, and the through vias are electrically connected to the electric integrated circuit die.

7. The package of claim 1, wherein a width of the first portion of the waveguide is constant, and a width of the second portion of the waveguide varies.

8. An optical device, comprising:
   a circuit substrate; and
   a package disposed on the circuit substrate, wherein the package comprises:
      a photonic integrated circuit die, comprising:
         a substrate comprising a notch, wherein the notch is occupied by air, and the notch extends from an interior of the substrate to an end edge of the substrate; and
         a waveguide disposed over the substrate, wherein the waveguide is partially overlapped with a span of the substrate and is partially overlapped with a span of the notch.

9. The optical device of claim 8, wherein the package further comprises:
   an electric integrated circuit die disposed over the photonic integrated circuit die;
   an encapsulant laterally encapsulating the electric integrated circuit die; and
   a redistribution structure dispose over the photonic integrated circuit die opposite to the electric integrated circuit die.

10. The optical device of claim 8, further comprising:
    an optical fiber disposed adjacent to the waveguide, wherein the optical fiber is optically coupled to the waveguide; and
    a supporting structure disposed on the circuit substrate, wherein the optical fiber is disposed on the supporting structure.

11. The optical device of claim 8, wherein a width of the notch gradually increases from the end edge of the substrate toward the interior of the substrate.

12. The optical device of claim 8, wherein a width of the notch gradually decreases from the end edge of the substrate toward the interior of the substrate.

13. The optical device of claim 8, wherein a width of the notch is uniform.

14. The optical device of claim 8, wherein the photonic integrated circuit die further comprises an etch stop layer located between the substrate and the waveguide.

15. The optical device of claim 8, wherein a height of the notch is equal to a thickness of the substrate.

16. The optical device of claim 8, wherein a height of the notch is smaller than a thickness of the substrate.

17. A manufacturing method of a package, comprising:
    providing a substrate having a first surface and a second surface opposite to the first surface;
    forming waveguides over the first surface of the substrate;
    placing an electric integrated circuit die over the waveguides;
    forming a redistribution structure on the second surface of the substrate;
    removing a portion of the substrate to form notches in the substrate such that the notches are completely occupied by air; and
    performing a singulation process to form the package such that the notch extends from an interior of the substrate to an end edge of the substrate.

18. The method of claim 17, wherein prior to the removal of the portion of the substrate, a portion of the redistribution structure is removed.

19. The method of claim 17, further comprising forming conductive pads over the redistribution structure prior to the removal of the portion of the substrate.

20. The method of claim 17, further comprising forming conductive pads over the redistribution structure after the removal of the portion of the substrate.

* * * * *